United States Patent
Okada et al.

(10) Patent No.: US 6,177,968 B1
(45) Date of Patent: Jan. 23, 2001

(54) OPTICAL MODULATION DEVICE WITH PIXELS EACH HAVING SERIES CONNECTED ELECTRODE STRUCTURE

(75) Inventors: Shinjiro Okada, Isehara; Hirohide Munakata, Yokohama; Takashi Enomoto, Sagamihara; Yutaka Inaba, Hino; Takahiro Hachisu, Yokohama, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/143,393

(22) Filed: Aug. 28, 1998

(30) Foreign Application Priority Data

Sep. 1, 1997 (JP) ................................ 9-235610
Apr. 30, 1998 (JP) ............................... 10-120213

(51) Int. Cl.⁷ .................... G02F 1/1343; G02F 1/141; G02F 1/13

(52) U.S. Cl. ..................... 349/38; 349/172; 349/143

(58) Field of Search ..................... 349/144, 33, 139, 349/100, 38, 172

(56) References Cited

U.S. PATENT DOCUMENTS

| | | | |
|---|---|---|---|
| 4,537,471 | * 8/1985 | Grinberg et al. | 349/144 |
| 4,674,839 | 6/1987 | Tsuboyama et al. | 350/334 |
| 4,738,515 | 4/1988 | Okada et al. | 350/350 S |
| 4,778,260 | 10/1988 | Okada et al. | 350/350 S |
| 4,800,382 | 1/1989 | Okada et al. | 340/784 |
| 4,830,467 | 5/1989 | Inoue et al. | 350/333 |
| 4,836,656 | 6/1989 | Mouri et al. | 350/350 S |
| 4,838,652 | 6/1989 | Inaba et al. | 350/331 R |
| 4,844,590 | 7/1989 | Okada et al. | 350/350 S |
| 4,878,740 | 11/1989 | Inaba et al. | 350/337 |
| 4,902,107 | 2/1990 | Tsuboyama et al. | 350/350 S |
| 4,917,470 | 4/1990 | Okada et al. | 350/333 |

(List continued on next page.)

FOREIGN PATENT DOCUMENTS

| | | |
|---|---|---|
| 1151818 | 6/1989 | (JP) . |
| 2153322 | 6/1990 | (JP) . |
| 4182694 | 6/1992 | (JP) . |
| 6230751 | 8/1994 | (JP) . |
| 8-76101 | 3/1996 | (JP) . |
| 8262447 | 10/1996 | (JP) . |
| 8328046 | 12/1996 | (JP) . |

OTHER PUBLICATIONS

K. Okano and S. Kobayashi, Liquid Crystals–Application Book (Ekisho–Oyo Hen in Japanese):, 1985, K.K. Baihukan.

Jpn. J. Appl. Phys., vol. 19 (1980), No. 10, Short Notes 2031.

(List continued on next page.)

*Primary Examiner*—William L. Sikes
*Assistant Examiner*—Toan Ton
(74) *Attorney, Agent, or Firm*—Fitzpatrick, Cella, Harper & Scinto

(57) ABSTRACT

An optical modulation device is constituted by a first substrate provided with a plurality of first electrodes each comprising a plurality of portions electrically independent of each other, a second substrate disposed opposite to the first substrate and provided with a plurality of second electrodes each confronting a corresponding first electrode, and an optical modulation substance disposed between the first and second substrates so as to form a plurality of pixels each having a particular electrode structure. In the electrode structure, the optical modulation substance is sandwiched between each second electrode and said portions of said corresponding first electrode so as to form a series circuit providing a plurality of capacitance, thus reducing the capacitance for each pixel to improve a switching characteristic while minimizing a defective portion due to a short-circuit between the confronting electrodes.

24 Claims, 22 Drawing Sheets

U.S. PATENT DOCUMENTS

| | | | |
|---|---|---|---|
| 4,923,285 | 5/1990 | Ogino et al. | 350/331 T |
| 4,925,277 | 5/1990 | Inaba | 350/350 S |
| 4,930,875 | 6/1990 | Inoue et al. | 350/333 |
| 4,931,787 * | 6/1990 | Shannnon | 349/144 |
| 4,932,759 | 6/1990 | Toyono et al. | 350/350 S |
| 4,958,912 | 9/1990 | Inaba et al. | 350/333 |
| 4,958,915 | 9/1990 | Okada et al. | 350/345 |
| 4,973,135 | 11/1990 | Okada et al. | 350/334 |
| 5,026,144 | 6/1991 | Taniguchi et al. | 350/350 S |
| 5,034,735 | 7/1991 | Inoue et al. | 340/784 |
| 5,126,865 * | 6/1992 | Sarma | 349/144 |
| 5,132,818 | 7/1992 | Mouri et al. | 359/56 |
| 5,136,282 | 8/1992 | Inaba et al. | 340/784 |
| 5,267,065 | 11/1993 | Taniguchi et al. | 359/56 |
| 5,379,138 | 1/1995 | Okada | 359/56 |
| 5,446,570 | 8/1995 | Kaneko et al. | 359/87 |
| 5,469,281 | 11/1995 | Katakura et al. | 359/56 |
| 5,471,229 | 11/1995 | Okada et al. | 345/89 |
| 5,485,293 * | 1/1996 | Robinder | 349/144 |
| 5,508,711 | 4/1996 | Okada | 345/97 |
| 5,519,411 | 5/1996 | Okada et al. | 345/89 |
| 5,521,727 | 5/1996 | Inaba et al. | 359/56 |
| 5,532,713 | 7/1996 | Okada et al. | 345/97 |
| 5,581,381 | 12/1996 | Shinjo et al. | 349/85 |
| 5,592,190 | 1/1997 | Okada et al. | 345/89 |
| 5,598,229 | 1/1997 | Okada et al. | 348/792 |
| 5,608,420 | 3/1997 | Okada | 345/89 |
| 5,610,739 * | 3/1997 | Uno et al. | 349/39 |
| 5,623,351 * | 4/1997 | Kondoh | 349/100 |
| 5,638,195 | 6/1997 | Katahara et al. | 349/143 |
| 5,646,755 | 7/1997 | Okada et al. | 345/97 |
| 5,650,797 | 7/1997 | Okada | 345/97 |
| 5,657,038 | 8/1997 | Okada et al. | 345/94 |
| 5,689,320 | 11/1997 | Okada et al. | 349/135 |
| 5,717,421 | 2/1998 | Katakura et al. | 345/101 |
| 5,754,154 | 5/1998 | Katakura et al. | 345/97 |
| 5,777,710 | 7/1998 | Okada et al. | 349/138 |
| 5,808,705 * | 9/1998 | Hishida et al. | 349/33 |
| 5,815,132 | 9/1998 | Okada et al. | 345/95 |
| 5,844,536 | 12/1998 | Okada et al. | 345/94 |

OTHER PUBLICATIONS

Y. Inaba et al., "Essential Factors in High–Duty FLC Matrix Display", Ferroelectrics, 1988, vol. 85, pp. 255–264, Gordon and Breach Science Publishers S.A.

N.A. Clark et al., Ferroelectric Liquid Crystal Electro–Optics Using The Surface Stabilized Structure, Molecular Crystals And Liquid Crystals, 1983, vol. 94, pp. 213–234, Gordon and Breach Science Publishers, Inc.

K. Miyasato et al., "Direct Method with Triangular Waves for Measuring Spontaneous Polarization in Ferroelectric Liquid Crystals", Journal of Applied Physics, vol. 22, No. 10, Oct. 1983, pp. L661–L663.

English Abstract for Japanese Laid–Open Application JP 08–076101 A, published Mar. 22, 1996.

* cited by examiner

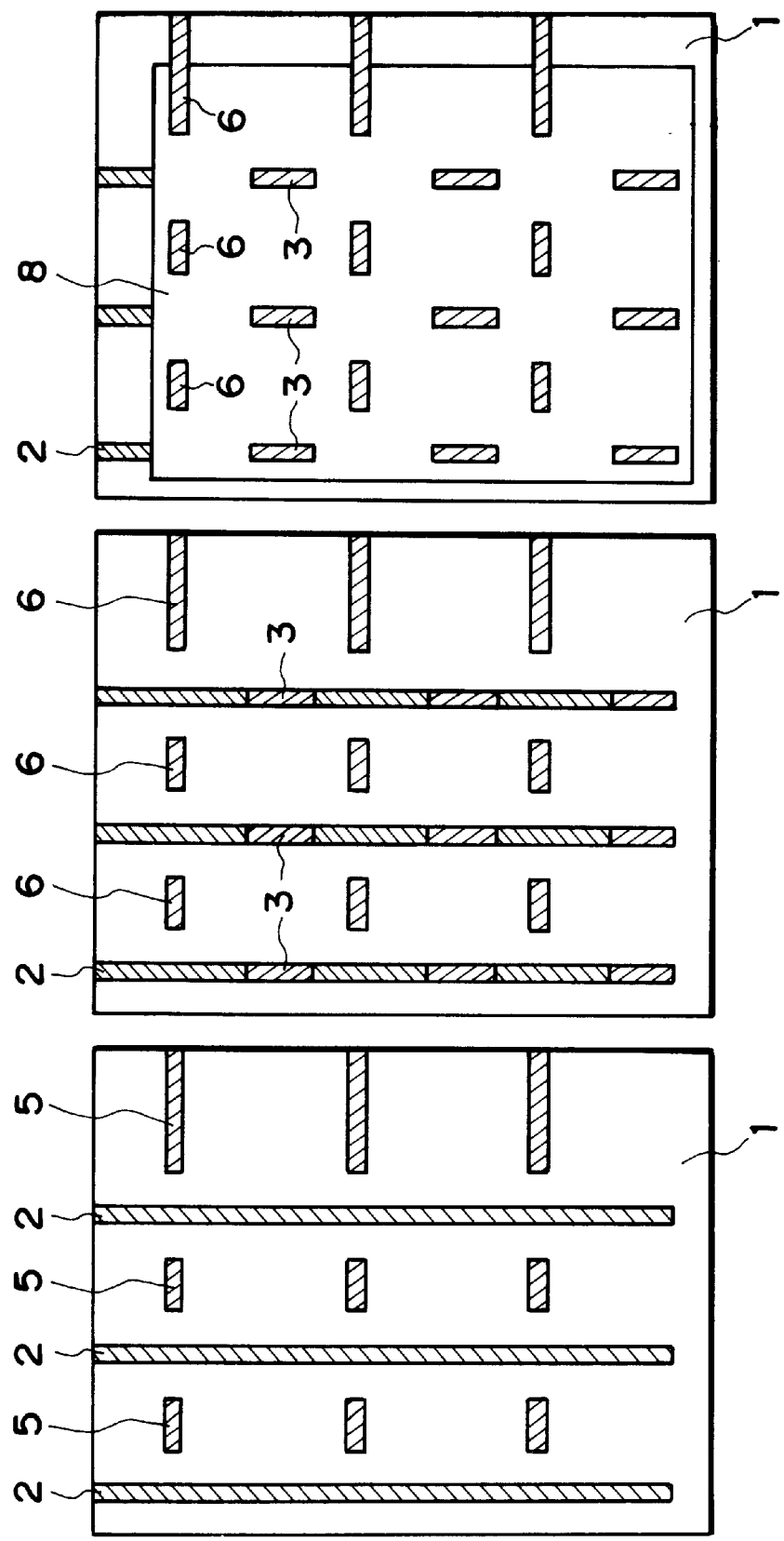

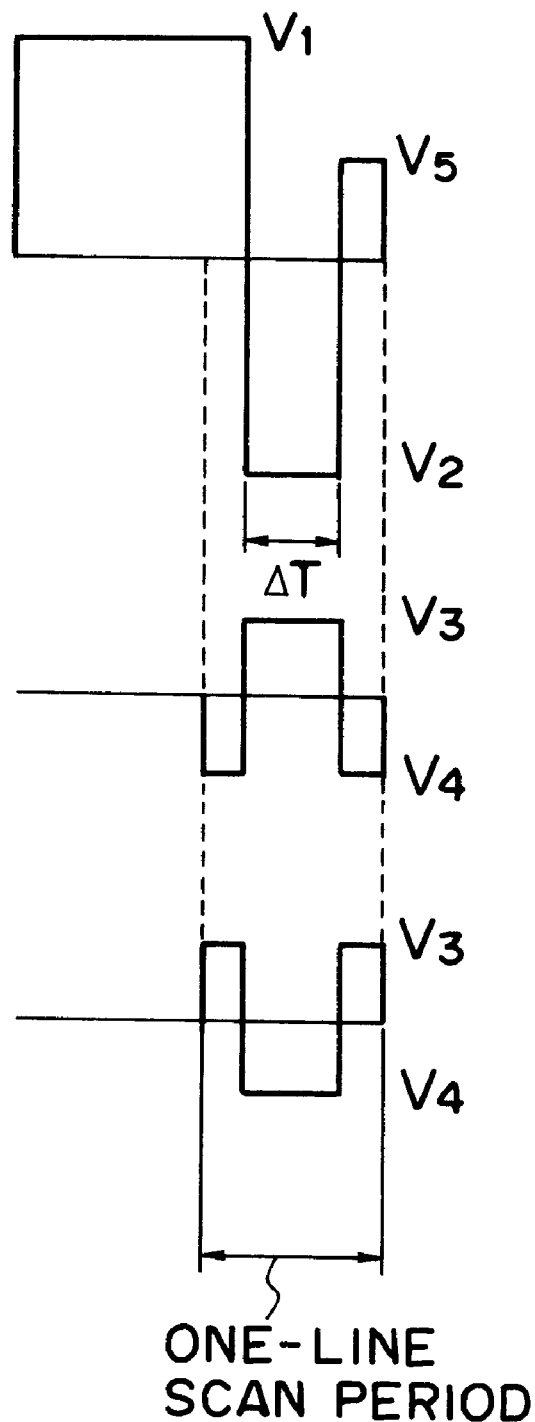

OPTICAL MODULATION DEVICE WITH PIXELS EACH HAVING SERIES CONNECTED ELECTRODE STRUCTURE

FIELD OF THE INVENTION AND RELATED ART

The present invention relates to an optical modulation device, particularly a liquid crystal device, for use in a display apparatus for displaying characters and images.

There have been known conventional liquid crystal (optical modulation) devices of, e.g., a simple matrix-type using a combination of stripe-shaped electrodes.

FIG. 14 shows an embodiment of such a conventional simple matrix-type liquid crystal device.

Referring to FIG. 14, a color liquid crystal device principally includes a pair of oppositely disposed transparent substrates 1 and 11 one of which is provided with color filters 13 (13a, 13b and 13c), and a liquid crystal 16 disposed between the substrates 1 and 11.

On the substrate 1, the color filters 13 or red (R) 13a, green (G) 13b and blue (B) 13c and a black matrix (e.g., a stripe-shaped light-interrupting layer) 12 disposed between the respective color filters 13a, 13b and 13c are formed and further thereon, a protective (flattening) layer 14 is formed. On the protective layer 14, a plurality of stripe-shaped electrodes 142 each provided with an auxiliary electrode 141 of a low-resistance material (e.g., metal) and are coated with an alignment film 143 contacting the liquid crystal 16.

On the other transparent substrate 11, a plurality of stripe-shaped electrodes 145 each provided with an auxiliary electrode 144 of a low-resistance material and intersecting the stripe-shaped electrodes 142 (on the opposite substrate 1) at right angles to form an electrode matrix and are coated with an alignment film 146 contacting the liquid crystal 16.

The transparent substrates 1 and 11 are applied to each other at the periphery thereof with a sealing agent (not shown) while leaving a prescribed call gap together with spacer beads 15 within the cell structure. The cell gap is filled with the liquid crystal 16, thus preparing a color liquid crystal device.

Such a conventional color liquid crystal device may, e.g., have a matrix electrode structure and may be driven by, e.g., a set of drive waveforms as described FIG. 3.6 on page 90 of "Liquid Crystals-Application Book (Ekisho-Oyo Hen in Japanese)" edited by Koji Okano and Shunsuke Kobayashi (1985) (K. K. Baihukan).

Generally, in the above liquid crystal device, one (group) of the stripe-shaped electrodes 142 and 145 is supplied with a scanning signal and the other (group) is supplied with a data signal.

As a display region size of the liquid crystal device is enlarged, the number of pixels thereof is correspondingly increased, thus resulting in an increase in number of scanning signal lines and data signal lines. For instance, there are various large-area liquid crystal devices in accordance with, e.g., a VGA (video graphics array) standard (scanning lines x data lines=480×600), an XGA (extended video graphics array) standard (768×1024) and an SXGA (super extended graphics array) standard (1024×1280).

As a result, such large-area liquid crystal devices have an increased capacitance between opposite electrodes and an increased amount of a charging current, thus requiring a larger current-carrying capacity of a driver IC (integrated circuit) used.

This problem is more noticeable in a surface-stabilized ferroelectric liquid crystal (SSFLC) display device using a ferroelectric liquid crystal.

This may be attributable to the following two factors (1) and (2).

(1) The ferroelectric liquid crystal device generally has a smaller cell gap (a distance between opposite electrodes) of 1/2 μm when compared with a conventional twisted nematic (TN) liquid crystal device having a cell gap being several times that of the ferroelectric liquid crystal device, thus having a larger capacitance between opposite electrodes. In the ferroelectric liquid crystal device, it is necessary to set a smaller cell gap in order to suppress a twisted alignment state of the ferroelectric liquid crystal molecules intrinsic thereto by constraint forces of the substrates to realize bistability as described in, e.g., N. A. Clark et al., "MCLC", vol. 94, pp. 213–234 (1983).

(2) The ferroelectric liquid crystal has a spontaneous polarization on which an external electric field acts, thus effecting switching of two stable states (bistable stables). During the switching, a polarization inversion current passes across the liquid crystal layer and becomes larger with an increasing spontaneous polarization. When the switching speed is increased by using a higher frequency of line-sequential scanning, the ferroelectric liquid crystal used is required to a larger spontaneous polarization.

The above factors (1) and (2) affect propagation delay of an input voltage (signal) waveform and an amount of heat evolution (generation) and a temperature distribution within a panel (liquid crystal device).

The heat evolution within the panel is (directly) proportional to a capacitance of the panel and an amount of a current at the time of fluctuation of liquid crystal molecules by the action of a non-selection signal application (application of a data signal to a selected data signal line on a non-selection pixel). The applied non-selection signal interacts with the spontaneous polarization passes through the panel. The degree of heat evolution due to the capacitance of the panel is comparable to that due to the fluctuation of a spontaneous polarization of 35 nC/cm$^2$. The heat evolution is also closely related to a drive frequency. As the drive frequency is decreased (i.e., a drive pulse width is increased), a current consumption due to the fluctuation of the spontaneous polarization becomes larger.

As a result, a heat evolution amount distribution within the panel becomes large because a temperature dependence of a threshold value of the ferroelectric liquid crystal is large (e.g., a degree of the threshold value change is about 10% by the temperature charge of about 1–2° C.) when compared to the nematic liquid crystal, thus largely affecting display qualities.

In the conventional cell structure of the liquid crystal device, each of opposite two substrates is provided with a plurality of stripe-shaped electrodes to be electrically connected with an external drive circuit, thus requiring lead-out portions to be connected with the drive circuit for the respective substrates. As a result, the liquid crystal device is accompanied with some problems in terms of a liquid crystal injection, an electrical connection with IC circuit(s) and an incorporation of the cell into a housing of the panel. These problems also arise in the nematic liquid crystal device. In the case of a conventional device having decreased scanning signal lines for display in watches, the above problems are remedied by using a means for connecting the scanning signal lines at the substrate provided with data signal lines via a conductor of, e.g., silver paste to effect electrical connection on the same substrate side. However, in a large-area liquid crystal device having a large number of pixels (according to the above-mentioned VGA, XGA, SXGA standards), it is substantially difficult to effect such an electrical connection on the same substrate side by drawing the lead-out portions (for electrical connection) disposed on one substrate onto the other substrate.

With respect to the ferroelectric liquid crystal device, there has been also known a phenomenon such that ion impurities within a liquid crystal cell are localized on a pair of opposite substrates by an internal electric field formed by the spontaneous polarization of liquid crystal molecules, as described in Yutaka Inaba et al., "Ferroelectrics", vol. 85, pp. 255–264 (1988).

Within the cell, an (ion) electric field formed by ions of the localized ion impurities is balanced with the internal electric field due to the spontaneous polarization. The ion electric field, however, is not removed instantly when the direction of the spontaneous polarization of the liquid crystal is inverted by external electric field application, thus adversely affecting the switching of the liquid crystal.

In order to improve such a switching characteristic, there have been some methods including: a decrease in ion impurities per se within the liquid crystal layer; an increase in dielectric constant of a dielectric film on the electrode; the use of a liquid crystal material having a small spontaneous polarization; and an electrical connection between a pair of electrode substrates by an electrically conductive material having a high (electric) resistance.

In the liquid crystal device, the ferroelectric liquid crystal is used in a smectic phase state providing a higher-ordered liquid crystal layer structure leading to a lower latitude in layer deformation, thus being liable to break its smectic layer structure (i.e., disturb an alignment or orientation state of liquid crystal molecules).

This may be attributable to not only a shear action between opposite (glass) substrates in a direction perpendicular to the cell thickness but also a cell structure using a pair of opposite disposed substrate.

The breakage of the smectic layer structure can effectively be suppressed by strongly bonding the opposite substrates to each other via adhesive beads. The use of such adhesive beads, however, excessively suppress a degree of the cell deformation, so that the resultant liquid crystal cell is liable to be accompanied with a problem of an occurrence of an unfilled portion of the liquid crystal (within the cell) due to volume shrinkage (contraction) during the liquid crystal injection and/or when left standing at low temperatures.

The cell structure wherein a liquid crystal layer is sandwiched between a pair of opposite substrates each provided with electrically connected electrodes is also liable to cause a short circuit between the opposite electrodes. Particularly, in the case of the ferroelectric liquid crystal, the cell structure is liable to cause an electrical short-circuit error between the opposite substrates because of the above-mentioned small cell thickness (1–2 $\mu$m) considerably smaller than that (being several times the cell thickness of the ferroelectric liquid crystal) of the ordinary nematic (TN) liquid crystal device.

Such a short circuit phenomenon may be attributable to the presence of metal contaminants, such as stainless steel powder (cuttings) generated during the liquid crystal device production process using a stainless steel apparatus, and aluminum powder (cuttings) within an aluminum-made storage cassette for the liquid crystal panel. The presence of these metal contaminants particularly adversely affects the ferroelectric liquid crystal device.

The occurrence of the short circuit in a simple matrix-type liquid crystal device leads to line defects including the short circuit portions, thus considerably adversely affecting resultant display qualities, utterly different from, e.g., an active matrix-type nematic liquid crystal device using thin film transistors (TFTs).

These problems largely affect a production yield and production costs of the resultant liquid crystal device.

An antiferroelectric liquid crystal also has a spontaneous polarization similarly as in the ferroelectric liquid crystal described above.

There have been known antiferroelectric liquid crystal devices including one using an antiferroelectric liquid crystal having a V-T (voltage-transmittance) characteristic showing a hysteresis as disclosed in Japanese Laid-Open Patent Application (JP-A) 2-153322 and one having a V-T characteristic showing an intermediate alignment (orientation) state free from a threshold (voltage) value as described in JP-A 8-328046. These two V-T characteristics are shown in, e.g., FIGS. 25A and 25B, respectively.

Specifically, in the liquid crystal device using the antiferroelectric liquid crystal providing the hysteresis V-T characteristic as show in FIG. 25A, the liquid crystal is placed in a first (light) transmittance state under no voltage application (applied voltage=0 volt) and on voltage increase in terms of absolute value, is switched or shifted from the first transmittance state to a second transmittance state under application of at least a first threshold value ($+V_1$ or $-V_1$). Further, on voltage decrease, the liquid crystal is switched from the second transmittance state to the first transmittance state under application of at most a second threshold value ($+V_2$ or $-V_2$). Accordingly, when a pair of polarizers are arranged to provide the liquid crystal with the darkest state under no voltage application, the resultant liquid crystal device (apparatus) can provide two (white an black) display states.

In the liquid crystal device using the antiferroelectric liquid crystal providing the V-T characteristic showing the intermediate alignment state, by appropriately selecting a liquid crystal material and a device (cell) structure, it is possible to provide the liquid crystal with an alignment characteristic including first to third alignment states such that the liquid crystal is in the first alignment state providing a first transmittance under no voltage application, and shifts or changes its alignment state from the first alignment state to the second alignment state providing a second transmittance under application of a voltage ($V_3$) of a first polarity (e.g., positive polarity) and shifts its alignment state from the first alignment state to said third alignment state opposite to the second alignment state and providing the second transmittance under application of a voltage ($-V_3$) of a second polarity (e.g., negative polarity) opposite to the first polarity and the device shows a voltage-transmittance characteristic such that a transmittance is continuously changed (decrease and the increase) depending on an applied voltage between the first and second transmittance.

Accordingly, when a pair of polarizers are arranged to provide the liquid crystal with the darkest state (providing the first transmittance) under no voltage application, it is possible to realize a continuous halftone image display between the dark (black) and bright (white) display states depending upon the applied voltage.

The above-described ferroelectric liquid crystal and antiferroelectric liquid crystal have a spontaneous polarization, thus allowing a high response speed and high-speed driving when compared with the nematic liquid crystal.

The ferroelectric liquid crystal and antiferroelectric liquid crystal are, however, required to be externally supplied with a current necessary for the spontaneous polarization inversion, thus resulting in a larger load for a drive circuit. This is particularly pronounced in the case of a larger spontaneous polarization.

More specifically, the ordinary twisted nematic (TN) liquid crystal device has an electrostatic capacity (capacitance) of the order of 2 nF/cm² between the opposite electrodes sandwiching the liquid crystal layer.

Assuming that a size of one pixel is 70 μm×210 μm, the capacitance for each (one) pixel is about 0.3 pF (=C). When the liquid crystal is driven under application of a drive voltage of 10 volts (=V), a necessary charging current amount (Q=CV) is 3 pC.

When compared with the TN liquid crystal device, in the ferroelectric or antiferroelectric liquid crystal device, a cell thickness (liquid crystal layer thickness) is ¼ to ⅕ and a relative dielectric constant of the ferroelectric or antiferroelectric liquid crystal is also ¼ to ⅕ of that of a typical TN liquid crystal material. As a result, the capacitance of the ferroelectric (antiferroelectric) liquid crystal device is comparable to that of the TN liquid crystal device.

The drive voltage for the ferroelectric (antiferroelectric) liquid crystal is generally 10–20 volts although it varies depending on a desired response speed, thus resulting in a necessary charging current amount equal to or at most two times that for the TN liquid crystal device.

In the cases of the ferroelectric liquid crystal and the antiferroelectric liquid crystal, however, if the liquid crystal used has a spontaneous polarization of 100 nC/cm², an additional electric charge (Q) for completely inverting the liquid crystal of Q=2Ps.S (S: one pixel area)=29 pC. Accordingly, when the liquid crystal device is driven by using the ferroelectric (antiferroelectric) liquid crystal having the spontaneous polarization of 100 nC/cm², a necessary charging current (electric charge) amount becomes about 10 times that for the TN liquid crystal device if the same cell structure is employed.

When an active matrix-type ferroelectric (antiferroelectric) liquid crystal device using a liquid crystal material having a large spontaneous polarization of, e.g., 100 nC/cm² is driven in a period identical to that for the TN liquid crystal device, a necessary current amount becomes at least 10 times that for the TN liquid crystal device, thus requiring a driving ability of each switching element (for each pixel) to be at least 10 times that in the TN liquid crystal device.

As the switching element for the active matrix-type liquid crystal device, a TFT is generally used.

In this instance, in order to increase the driving ability (i.e., a conductance between source and drain electrodes at the time of a gate "ON" state), the TFT is required to increase in size (e.g., at least 10 times the original size) while reducing an opening rate of the liquid crystal device. Accordingly, the use of such a large-sized TFT is not practical.

Particularly, with respect to a liquid crystal device using an antiferroelectric liquid crystal having a V-T characteristic as shown in FIG. 25B, it is expected to effect a continuous halftone image display through an active matrix driving scheme using the TFTs. However, the antiferroelectric liquid crystal used has a spontaneous polarization of at least 100 nC/cm² at present, so that it is difficult to effect the active matrix driving scheme by using the (ordinary) TFTs.

SUMMARY OF THE INVENTION

In view of the above-mentioned problems, an object of the present invention is to provide an optical modulation device with a large picture area, excellent display qualities, an improved production yield and an inexpensive production process.

A specific object of the present invention is to provide a liquid crystal device reduced in capacitance, improved in switching characteristics and strength, and suppressed in influence of defective pixels on display images due to a short circuit between opposite electrodes.

According to the present invention, there is provided an optical modulation device, comprising:

a first substrate provided with a plurality of first electrodes each comprising a plurality of portions electrically independent of each other, a second substrate disposed opposite to the first substrate and provided with a plurality of second electrodes each confronting a corresponding first electrode, and an optical modulation substance disposed between the first and second substrates so as to form a plurality of pixels each having an electrode structure wherein the optical modulation substance is sandwiched between each second electrode and said portions of said corresponding first electrode so as to form a series circuit providing a plurality of capacitance.

According to the present invention, there is also provided an optical modulation device, comprising:

a first substrate provided with a plurality of scanning signal lines, a plurality of data signal lines intersecting the scanning signal lines, a plurality of pixel electrodes each comprising a plurality of portions electrically independently of each other, and a plurality of switching elements;

a second substrate provided with a plurality of counter electrodes confronting the pixel electrodes and electrically independent of each other, and an optical modulation substance disposed between the first and second substrates so as to form a plurality of pixels each provided with one switching element and each having an electrode structure wherein the optical modulation substance is sandwiched between each counter electrode and the portions of each corresponding pixel electrode so as to form a series circuit providing a plurality of capacitances as a load for each switching element.

In the above optical modulation device, the optical modulation substance may preferably be a liquid crystal showing first to third alignment state such that the liquid crystal is in the first alignment state providing a first transmittance under no voltage application, and changes its alignment state from the first alignment state to the second alignment state providing a second transmittance under application of a voltage (V0) of a first polarity and changes its alignment state from the first alignment state to the third alignment state opposite to the second alignment state and providing the second transmittance under application of a voltage (−V₀) of a second polarity opposite to the first polarity, and the device may preferably show a voltage-transmittance characteristic such that a transmittance is continuously changed depending on an applied voltage between the first and second transmittances, thus allowing a good gradation display.

Herein, the expression "transmittance is continuously changed" means that the transmittance is controllable by the applied voltage within a range having a transmittance changing rate of 5–95% based on a maximum transmittance.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7A, 7B and 7C are schematic plan views showing a sequence of production steps of the electrode substrate shown in FIG. 4A.

FIGS. 9A–9C, FIGS. 10A–10E and FIGS. 11A–11C are each a set of drive waveforms used in Examples 1, 2 and 3 appearing hereinafter, respectively.

DETAILED DESCRIPTION OF THE PREFERRED EMBODIMENTS

In the optical modulation device according to the present invention, an optical modulation substance (preferably a liquid crystal) is sandwiched between a pair of electrode plates (substrates each provided with a plurality of electrodes) so as to form a plurality of pixels each having an electrode structure wherein a scanning electrode and a data electrode are electrically independent of each other and are disposed on one substrate and a counter electrode (or common electrode) confronting the scanning electrode and data electrode is disposed on the other substrate and is electrically independent of adjacent counter electrodes. Further, a plurality of the scanning electrodes and a plurality of data electrodes on the same substrate are arranged so as to form an electrode matrix where scanning signal lines intersect data signal lines to provide a plurality of electrically independent portions including at least one scanning electrode and at least one data electrode for each (one) pixel, thus providing a series circuit for each pixel providing a plurality of capacitor portions each having a prescribed capacitance.

In the optical modulation device of the present invention, the matrix electrode structure by the scanning electrodes and the data electrodes is formed on one substrate side and the corresponding counter electrode structure including the counter electrodes each corresponding to one pixel is formed on the other substrate side, thus effectively reducing the above-mentioned capacitance (electrostatic capacity) to provide a resultant optical modulation device with a large picture area. Further, it is unnecessary to provide lead-out portions (for electrical connection) to the counter electrodes since the counter electrodes are in a floating state, whereby drive ICs may be electrically connected with the scanning electrodes and the data electrodes on one substrate side. Thus, the other substrate provided with the counter electrodes may be a resin substrate thereby to provide a light weight optical modulation device excellent in shock (impact) resistance. In the optical modulation device having the above-described electrode structure, a defect due to a short circuit between opposite electrodes is merely a point defect at the short circuit portion, thus minimizing the influence on display images up to a level similar to an optical modulation device of an active matrix-type.

Hereinbelow, the electrode structure of the optical modulation device employed in the present invention will be described with reference to FIG. 2.

Figure 2:
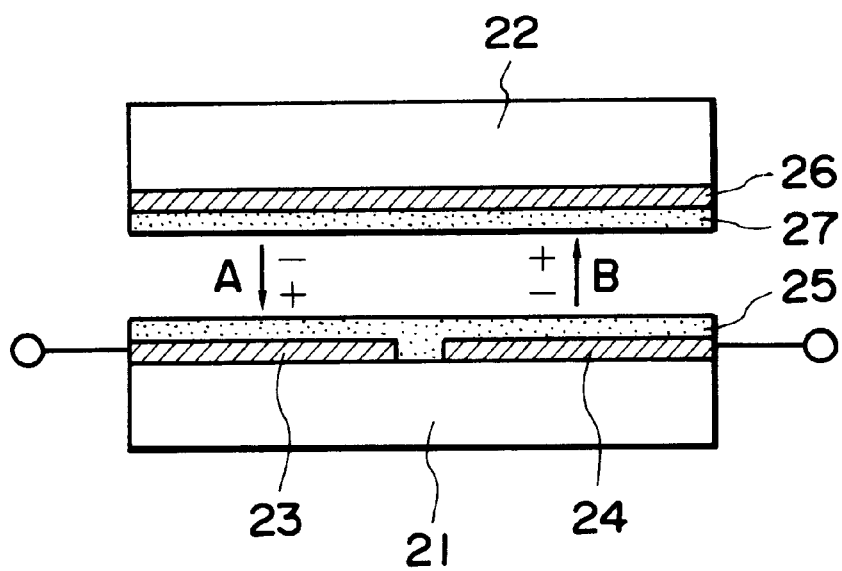
FIG. 2 is a schematic sectional view for illustrating an action of an electrode structure employed in the optical modulation device of the present invention.

FIG. 2 is a schematic sectional view showing an electrode structure (arrangement) for one pixel for explaining the action thereof.

Referring to FIG. 2, in each pixel, a pair of glass substrates 21 and 22 are oppositely disposed and an optical modulation substance is sandwiched between the substrates 21 and 22. The substrate 21 is coated with an electrode (e.g., scanning electrode) 23 and another electrode (e.g., data electrode) 24, which are further coated with an alignment (control) film 25. The other substrate 22 is coated with a counter electrode 26 and further coated with an alignment film 27.

As the optical modulation substance, a liquid crystal such as a nematic liquid crystal, a ferroelectric liquid crystal or an antiferroelectric liquid crystal may preferably be used. In this embodiment, the ferroelectric liquid crystal is employed as an example.

As described above, the ferroelectric liquid crystal has a spontaneous polarization and is usable in the optical modulation device since the ferroelectric liquid crystal has a certain relationship between a direction of the spontaneous polarization and an alignment (or orientation) direction of liquid crystal molecules.

For instance, when an electric field using the electrode 23 as a positive pole is applied between the electrodes 23 and 24, dipoles of the spontaneous polarization of the ferroelectric liquid crystal are oriented in directions of arrows A and B as shown in FIG. 2. Specifically, based on the counter electrode 26, the direction of the applied electric field on the electrode 23 is opposite to that of the electric field on the electrode 24, thus resulting in two electric field regions (for one pixel) including a first region where the electric field is oriented from the electrode 23 to the counter electrode 26 and a second region where the electric field is oriented from the counter electrode 26 to the (other) electrode 24. Accordingly, when the liquid crystal molecules having the two director directions A and B are placed together in a bright (white) state or a dark (black) state, it is possible to well effect a matrix driving using a plurality of pixels formed by the matrix electrode structure.

Figure 3:
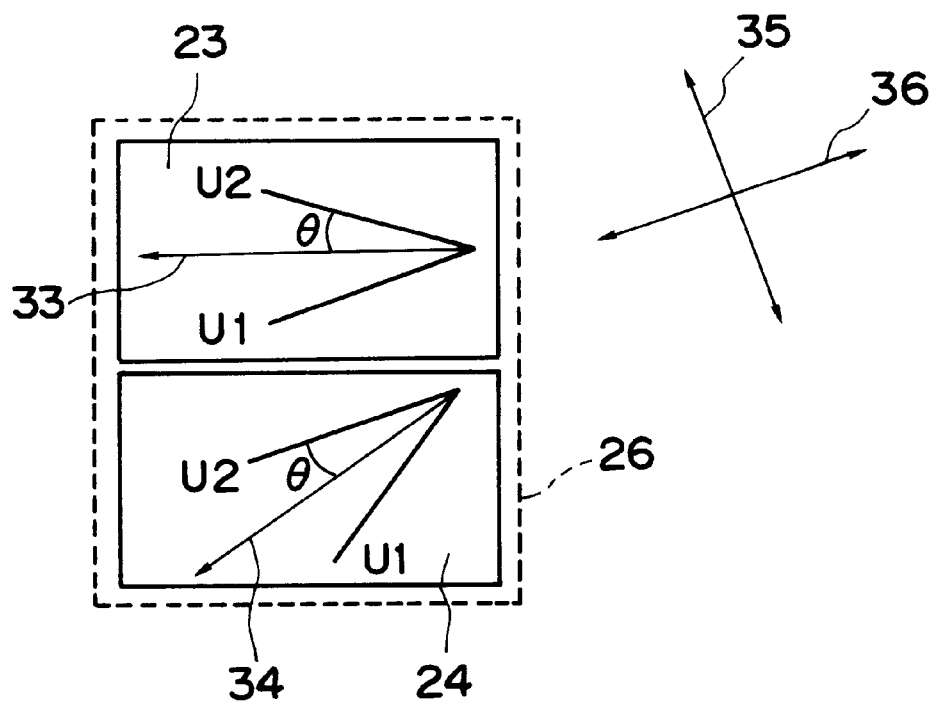
FIG. 3 is a schematic plan view showing positional relationships with respect to rubbing directions, liquid crystal alignment states and polarizers.

FIG. 3 is a schematic plan view of the electrode structure shown in FIG. 2 for illustrating positional relationships with respect to rubbing directions, molecular alignment directions and polarizing axis directions.

Assuming that an electric field providing electric line of force directed toward the counter electrode 26 is "+" electric field, when the "+" electric field is applied to the electrode 23, the electrode 24 is supplied with "−" electric field. In this state, in order to provide "black" state over the pixel (i.e., in the two regions on the electrodes 23 and 24), it is necessary to effect a rubbing treatment as shown in FIG. 3 providing two different rubbing directions. Referring to FIG. 3, an alignment film portion on the electrode 23 is rubbed in a rubbing direction 33 in the first region and an alignment film portion on the electrode 24 is rubbed in a rubbing direction 34 in the second region. The ferroelectric liquid crystal molecules are placed in a first stable state U1 or a second stable state U2 depending on the applied electric field. The directions of the first and second stable states U1 and U2 are different in the first and second regions, respectively, but provides an identical angle of 2θ (θ: title angle). In other words, an average molecular axis direction (optical axis direction) in the U1 is different from that in the U2 by the angle of 2θ in the first and second regions, respectively. A pair of polarizers having polarizing axes 35 and 36 is arranged so that the polarizing axis 36 is in parallel with the molecular axis direction in the U1 in the first region and the molecular axis direction in the U2 in the second region.

Based on the rubbing direction 33 in the first region (on the electrode 23), when the rubbing direction 34 in the second region (on the electrode 24) is shifted therefrom by an angle of 2θ or 2θ+180 degrees (2θ in FIG. 3) an the liquid crystal molecules in the first region are supplied with the "+" electric field, the liquid crystal molecules on the electrode 23 are placed in the stable state U1 and those on the electrode 24 (in the second region) are supplied with the "−" electric field thereby to be placed in the stable state U2. In this state, the molecular axis direction in the U1 (on the electrode 23) is in parallel with not only that in the V2 (on the electrode 24) but also the polarizing axis direction 36, thus realizing the "black" state over the entire pixel (including the first and second regions).

On the other hand, when the "−" electric field is applied to the liquid crystal molecules on the electrode 23, the liquid crystal molecules on the electrode 32 are placed in the stable state U2 and those on the electrode 24 are placed in the table state U1. In this state, each of the molecular axis directions in the stable states U1 and U2 is not parallel with the polarizing axes 35 and 36 and is shifted therefrom by a certain angle, thus providing the "white" (light transmission) state. At this time, the liquid crystal molecules are placed in different (opposite) stable states U1 and U2 on the electrodes 23 and 24 in one pixel, thus improving a viewing angle characteristic when compared with those placed in an identical alignment state (U1 or U2) as in the conventional optical modulation device.

As described above, it is possible to effect black and white display (providing two display states) by providing a pair of electrodes forming an electric field in one pixel region to the same substrate. Accordingly, when the resultant optical modulation (liquid crystal) device is provided with a plurality of pixels (each having the above-mentioned electrode structure) formed by scanning electrodes and data electrodes arranged in an electrode matrix, it is possible to realize a matrix driving (e.g., multiplexing driving) similarly as in a conventional simple matrix-type liquid crystal device having an electrode matrix formed by scanning electrodes on one substrate and data electrodes on the other substrate.

In the present invention based on the above-mentioned electrode structure, an electrode area for one pixel is substantially reduced to half of the conventional one and on the other hand, the liquid crystal layer thickness substantially becomes twice, thus decreasing a capacitance of one pixel to ¼ of that of one pixel having the same pixel size in the conventional electrode structure. As a result, it becomes possible to minimize a propagation delay of an applied voltage signal waveform. Further, the counter electrodes disposed opposite to the scanning electrodes and the data electrodes arranged in the electrode matrix one electrically independent of each other for each (one) pixel, so that even when a short circuit due to the presence of metal impurities occurs between the counter electrodes and the scanning electrodes and/or between the counter electrodes and the data electrodes, display failure is caused only in a pixel including the short circuit portion, thus resulting in only a point defect at the pixel. The electric matrix structure is formed on one substrate side in the present invention, whereby the structure of the other substrate is considerably simplified, thus improving a production yield of the substrate to reduce a total production cost of the resultant optical modulation device. In addition, when the other substrate having thereon the counter electrodes is not provided with auxiliary electrodes of metal, the resultant optical modulation device can be prepared more inexpensively.

The liquid crystal (optical modulation) device is supplied with a drive waveform superposed with a DC offset voltage of, e.g., 50–200 mV (which adversely affect the switching characteristic of the liquid crystal material used) in some cases. The liquid crystal device using the ferroelectric liquid crystal is generally largely affected by such a DC offset voltage component since the switching between two stable states is based on inversion of the polarities of the applied voltage, thus leading to an inferior bistable switching.

In the present invention, however, as described above, the liquid crystal layer thickness supplied with the electric field between the scanning electrode and data electrode via the counter electrode for one pixel is substantially increased to two times that of the liquid crystal device having the ordinary electrode structure, thus substantially reducing the applied DC offset voltage to half that in the ordinary electrode structure thereby to reduce the influence of the DC offset voltage component on the switching characteristic.

Hereinbelow, the structure of the optical modulation device of the present invention will be described more specifically with reference to FIGS. 1 and 4 to 8.

Figure 1:
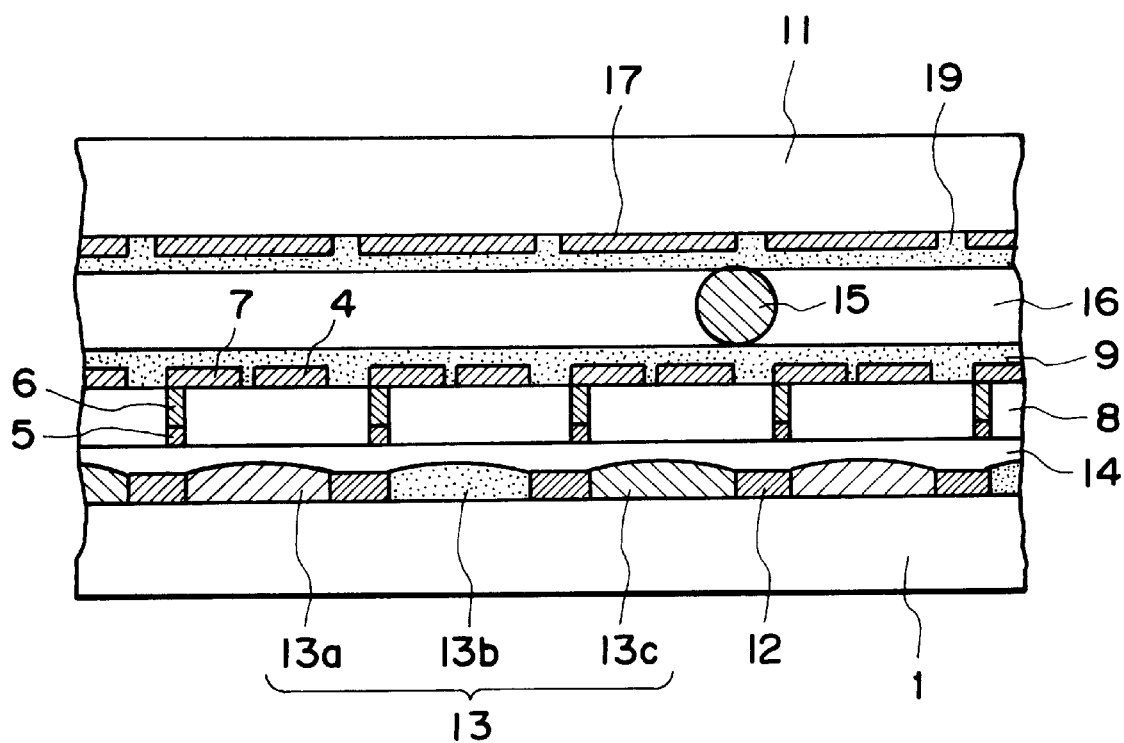
FIG. 1 is a schematic sectional view of an embodiment of an optical modulation device according to the present invention.

FIG. 1 is a schematic sectional view of an embodiment of the optical modulation (liquid crystal) device of the present invention.

Referring to FIG. 1, the optical modulation device includes a pair of oppositely disposed transparent substrates 1 and 11 and a chiral smectic liquid crystal 16 disposed between the substrates 1 and 11.

On the substrate 1, a plurality of color filters 13 of red (R) 13a, green (G) 13b and blue (B) 13c and a black matrix 12 filling spacings between the color filters 13a, 13b and 13c are formed and thereon, a protective (flattening) film 14 is formed.

On the protective film 14, a plurality of metal (auxiliary) electrodes 5 and 6 (for providing a plurality of data electrodes 7 with a low electrical resistance) and an insulating resin layer 8 are disposed.

Figure 4A:
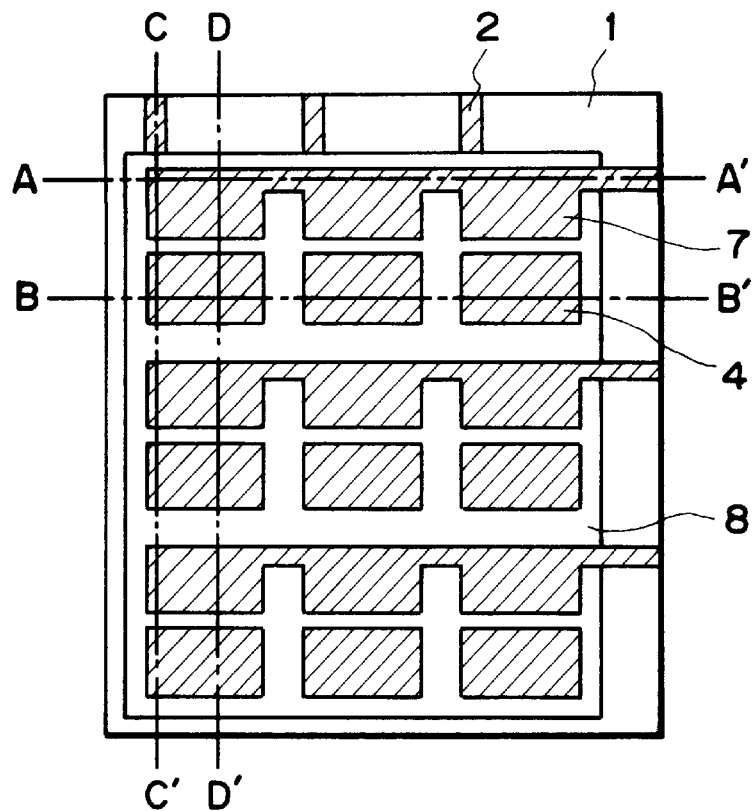
FIG. 4A is a schematic plan view showing an electrode arrangement on one of a pair of substrates constituting the optical modulation device of the present invention.

On the metal electrodes 6 and the resin layer 8, a plurality of scanning electrodes 4 and a plurality of data electrodes 7 are disposed so that the respective data electrodes 7 are electrically connected with the corresponding metal electrodes 6 (and 5), respectively. The respective scanning electrodes 4 are also electrically connected with corresponding metal electrodes (not shown) as described hereinbelow. These scanning and data electrodes 4 and 7 are arranged to form an electrode matrix as shown in FIG. 4A so that a pair of a scanning electrode 4 and a data electrode 7 constitute one pixel.

The scanning and data electrodes 4 and 7 are coated with an alignment (control) film 9.

Figure 4B:
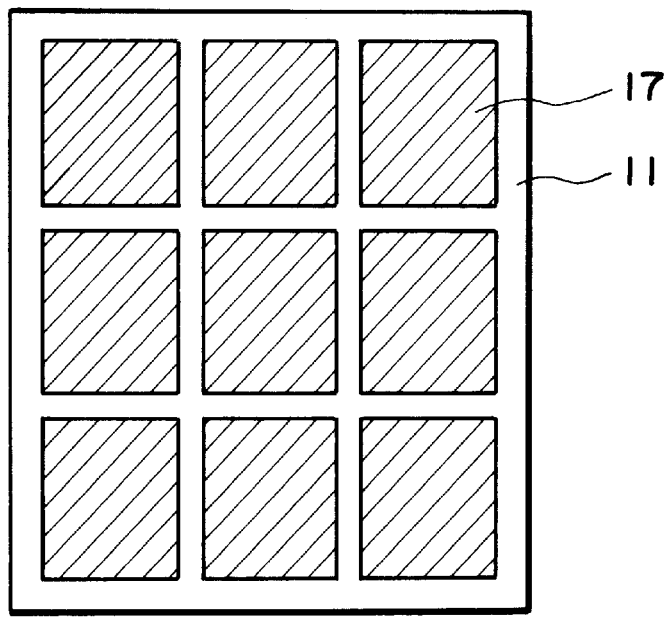
FIG. 4B is a schematic plan view showing a corresponding electrode arrangement on the other substrate.

On the other substrate 11, a plurality of counter electrodes (common electrodes) 17 electrically independent of each other and each corresponding to one pixel are formed as shown in FIG. 4B.

The counter electrodes 17 are coated with an alignment film 19.

The pair of substrates 1 and 11 thus prepared are applied to each other so as to ensure a prescribed cell gap by using spacer beads 15.

In the present invention, the counter electrodes are in a floating state, so that it is unnecessary for the substrate 11 to be provided with lead-out portions for external electrical connection, thus omitting the electrical connection structure on one substrate side (the substrate 11).

In this regard, breakage (disorder) of the alignment state of the ferroelectric liquid crystal which may be attributable to application of a deformation force onto the cell structure is effectively suppressed in the present invention when compared with a liquid crystal cell structure formed by a pair of electrode plates each having an electrical connection structure susceptible to the deformation force in a direction perpendicular to the electrode plates.

The transparent substrate 1 and 11 may generally be formed of glass. In the present invention, the substrate 11 may be a (transparent) resin substrate. The resin substrate is liable to be deformed compared to the glass substrate, thus causing a change in cell thickness when the resin substrate is provided with electrodes electrically connected with external drive ICs. However, in the present invention, the transparent substrate is not connected with the external ICs, thus allowing the use of the resin substrate as the substrate 11. The resin substrate is readily deformed, thus absorbing a vibration of the entire cell. As a result, when compared to the cell structure using a pair of glass substrates, it becomes possible to improve a shock (impact) resistance of the entire cell structure. Further, the use of the resin substrate also allows prevention of an occurrence of an unfilled portion of the liquid crystal (during the liquid crystal injection and at the time of being left standing at low temperature) while retaining a good shock resistance without using adhesive heads between the pair of substrates.

Examples of a material for the resin substrate may preferably include polyester, polysulfide and polycarbonate.

The polyester has stretching properties and may readily be formed in a film by stretching. The polysulfide and polycarbonate may be formed in a firmly by casting. These films have a heat resistance up to at least 100° C. (at least about 180° C. for the polyester and polysulfide films). Further, the sulfide film and the polycarbonate film have a high transparency. It is also possible to use a polarizing plate as the resin substrate.

In the present invention, the materials and arrangements for the black matrix 12, color filters 13 and protective film 14 formed on the substrate 1 may be identical to those used in a conventional color liquid crystal device and are not particularly restricted. In the case of effecting the black and white display, the color filters 13 may be omitted.

Figure 5:
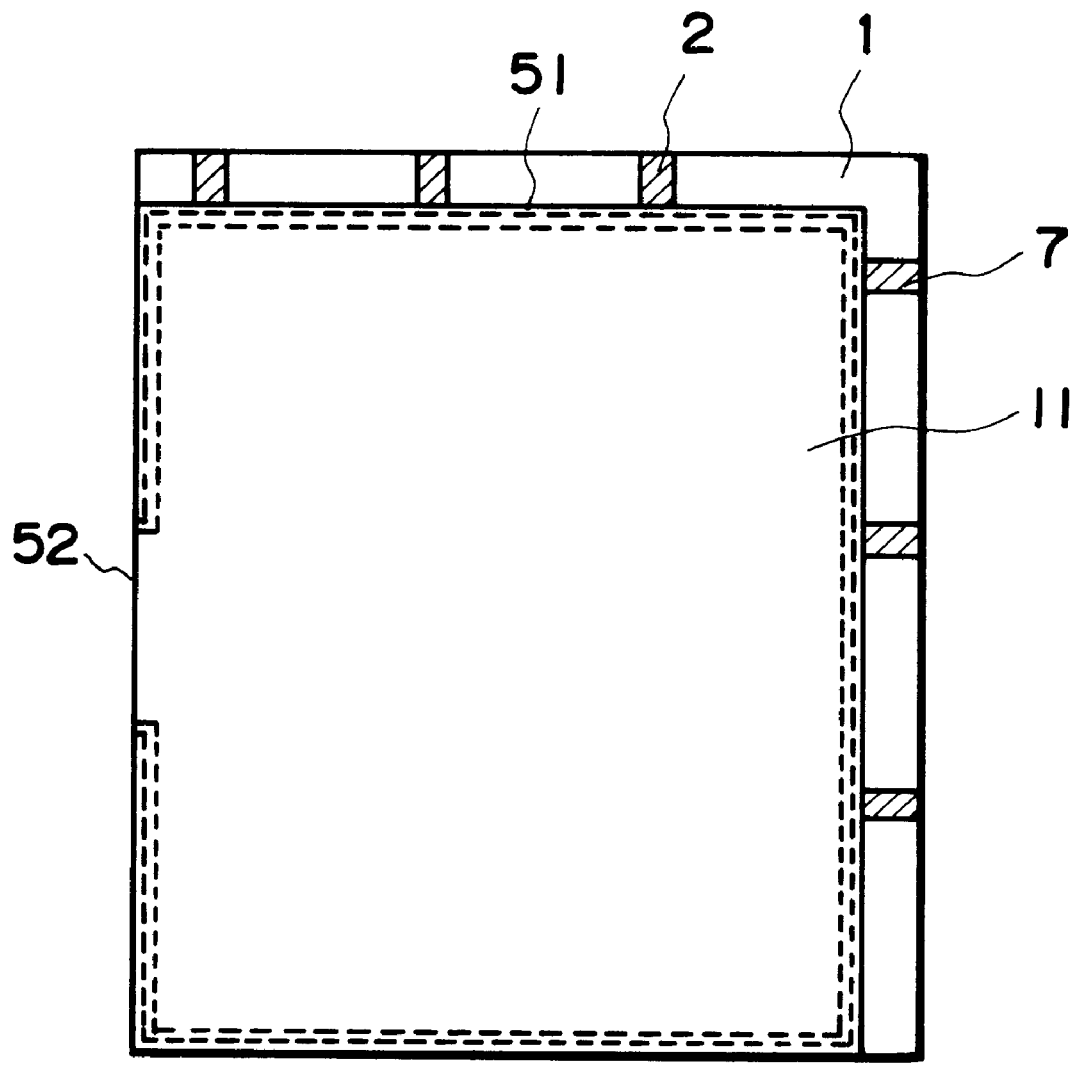
FIG. 5 is a schematic plan view of the optical modulation device of the present invention wherein the pair of substrates provided with the electrode arrangements shown in FIGS. 4A and 4B are applied to each other.
Figure 6A:
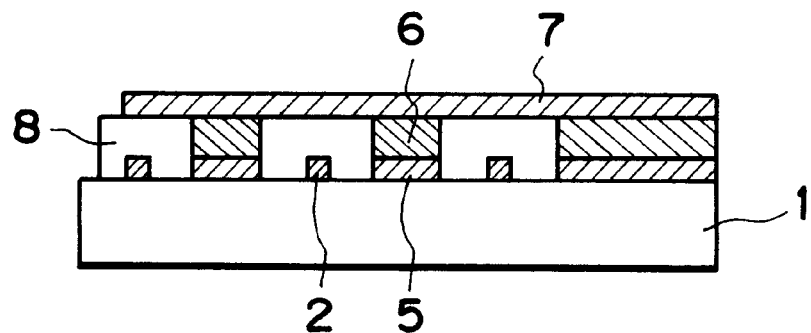
FIGS. 6A to 6D are schematic sectional views taken along A–A', B–B', C–C' an D–D' lines of FIG. 4A, respectively.

FIGS. 4A and 4B show electrode structure on the substrates 1 and 11, respectively. FIG. 5 illustrates a state that these electrode plates are applied to each other via a sealing agent 51 while leaving a liquid crystal injection port 52. FIGS. 6A an 6D are cross-sectional views taken along A–A' line, B–B' line, C–C' line and D–D' line of FIG. 4A, respectively.

Figure 6B:
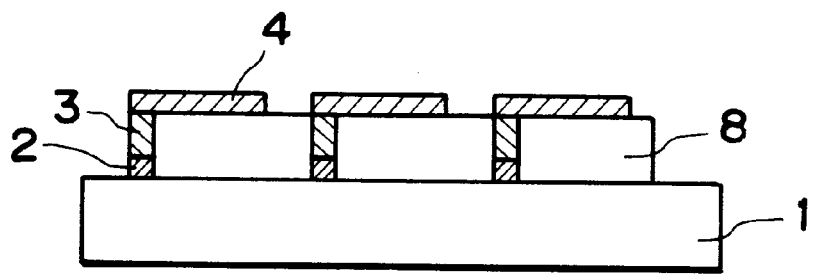
Figure 6C:
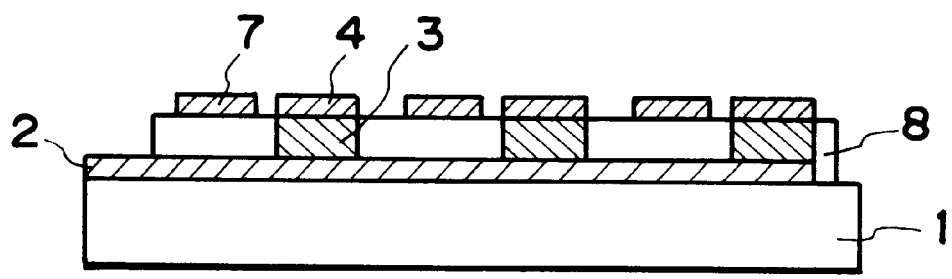
Figure 6D:
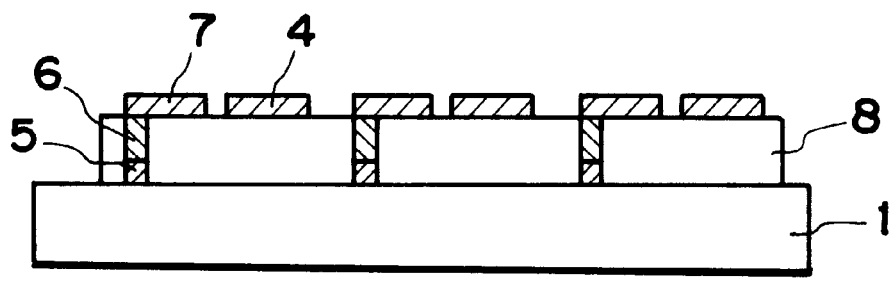

As shown in FIGS. 6A and 6D, the data electrodes 7 are electrically connected with the metal electrodes 5 and 6 embedded in the resin layer 8. On the other hand, as shown in FIGS. 6B an 6C, the scanning electrodes 4 are electrically connected with metal electrodes 2 and 3 also embedded in the resin layer 8. As apparent from these figures in combination with FIG. 4A, the respective data electrodes 7 extend in a right-and-left direction on the resin layer 8 and the respective scanning electrodes 4 extend in a direction perpendicular to the right-and-left direction under (at the bottom portion of) the resin layer 8. As a result, the electrode matrix structure is formed on the same substrate (the substrate 1).

FIGS. 7A to 7C shows a sequence of steps for forming such an electrode matrix structure on the substrate 1.

As shown in FIG. 7A, lower metal electrodes 2 and 5 are formed on the substrate 1 in prescribed patterns, respectively. Then, on the lower metal electrodes 2, upper metal electrodes 3 for electrical connection with the scanning electrodes 4 are partially formed and on the lower metal electrodes 5, upper metal electrodes 6 for electrical connection with the data electrodes 7 are formed as shown in FIG. 7B. Thereafter, a space defined by these metal electrodes 2, 3, 5 and 6 is filled with the resin layer 8 as shown in FIG. 7C.

The respective lower metal electrodes 2 and 5 may preferably have a thickness of 500–5000 Å and may be formed of, e.g., Mo-Ta alloy, Al alloy, Cu or Cu alloy.

The respective upper metal electrodes 3 and 6 may preferably have a thickness of 1–2 $\mu$m and may be formed of, e.g., Cu, Al alloy or Cu alloy.

The resin layer 8 may preferably be formed of a UV (ultraviolet)-curable resin according to a method as described in JP-A 8-76101.

According to this method, it is possible to effectively form a flat (even) resin layer 8 while exposing the surfaces of the (upper) metal electrodes 3 and 6 without attachment of the resin used.

After the step shown in FIG. 7C, the data and scanning electrodes 7 and 4 are formed on the resin layer 8 while being electrically connected with the exposed (upper) metal electrodes 6 and 3, respectively (FIG. 4A).

The respective data electrodes 7 extending in the right-and-left direction (as shown in FIG. 4A) may be further coated with a 100–2000 Å thick metal electrode of, e.g., Cu or Al alloy for each data electrode line 7 in order to further lower the electric resistance of the respective data electrodes 7.

On the substrate 11, a plurality of independent counter electrodes 17 each corresponding one pixel are directly formed.

Incidentally, for convenience, the black matrix 12, the color filters 13 and the protective film 14 are omitted from FIGS. 4–7.

As described above, in the present invention, by the use of the low-resistance metal electrodes 2, 3, 5 and 6 and the resin layer 8 in combination, the data electrodes 7 and the scanning electrodes 4 are arranged in the electrode matrix having a vertical electrical connection structure as shown in FIGS. 6A–6D. Incidentally, FIG. 1 corresponds to a cross-sectional view taken along the D–D' line of FIG. 4A similarly as in FIG. 6D.

In the present invention, the data electrodes 7 and the scanning electrodes 4 may preferably be formed of, e.g., an ordinary electroconductive transparent material such as ITO (indium-tin-oxide) in a thickness of 500–1500 Å. These electrodes 7 and 4 may be, e.g., an electroconductive resin film containing electroconductive particles dispersed therein, which is readily formed by a wet-coating method different from the ITO film formed by vacuum sputtering and etching, thus reducing production costs.

The alignment films 9 and 19 may preferably be formed of, e.g., polyamide, polyimide, polyvinyl alcohol or nylon.

Figure 8:
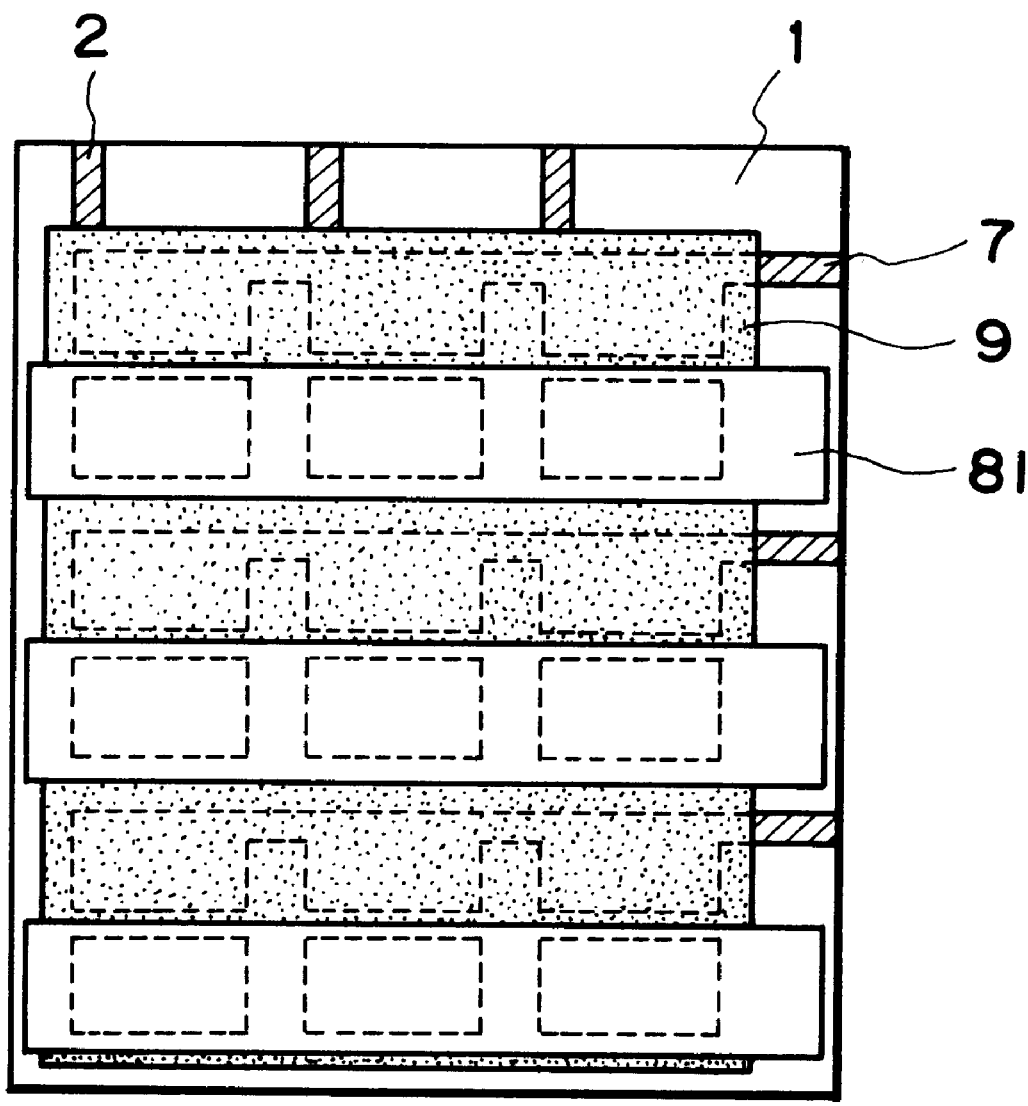
FIG. 8 is a schematic sectional view showing a step of rubbing treatment employed in preparing the optical modulation device of the present invention.

As described above, the alignment film 9 is provided with different rubbing directions on the data electrodes 7 and the scanning electrodes 4, respectively, thus being subjected to two times of a rubbing treatment in which the rubbing direction is changed for two portions of the data electrodes 7 and the scanning electrodes 4, respectively. Specifically, the entire alignment film 9 is rubbed in one direction. Thereafter, one group of the data electrodes 7 and the scanning electrodes 7 is covered with a resist 81 as shown in FIG. 8, followed by rubbing treatment in another direction. Consequently, the different rubbing directions 33 and 34 as shown in FIG. 3 are provided to the alignment film 9.

The opposite alignment film 19 is also subjected to two times of the similar rubbing treatment as in the alignment film 9 so that their rubbing directions coincide with the corresponding (confronting) rubbing directions, respectively.

In the present invention, it is possible to enhance the switching characteristic of the ferroelectric liquid crystal by using an alignment film 19 having a certain electroconductivity.

The reason why the influence of the reverse electric field due to the spontaneous polarization is alleviated has not been clarified as yet but may be attributable to an electroconductive state such that the localization of ions on the electrodes due to an internal electric field induced by the spontaneous polarization is readily removed. Specifically, when the ferroelectric liquid crystal placed in one stable state wherein liquid crystal molecules are oriented in one direction together with the localized ions (the formation of the reverse electric field) is inverted (switched) to the other stable state, a state of the localized ions before the inversion becomes unstable. At this time, if the localized ion state is not removed or alleviated quickly, the resultant inverted stable (of the liquid crystal molecules) becomes unstable to the contrary, thus hindering a complete inversion (switching). The electroconductivity of the alignment film 19 may be considered to be closely related with the removal or alleviation of such an ion localization state.

The electroconductive alignment film 19 may preferably have a sheet resistance of at most $1 \times 10^{13}$ ohm/□ to obtain a desired effect and may be formed of, e.g., a polyimide or polyamide film containing dispersed tin oxide particles or an inorganic film of a silicon oxide matrix (binder) containing ultrafine particles of an oxide such as SnOx dispersed in the matrix.

In the present invention, when the counter electrodes 17 is formed of such an electroconductive film, it is possible to achieve the similar effect without using the electroconductive alignment film 19.

The liquid crystal (optical modulation) device having the above-described structure according to the present invention may be driven in an ordinary simple matrix driving scheme, particularly in a multiplexing driving scheme by using an appropriate drive waveform, e.g., as shown in FIGS. 9A–9C wherein FIG. 9A shows a scanning signal waveform and FIGS. 9B and 9C show data signal waveforms.

In the present invention, as the optical modulation substance, a chiral smectic liquid crystal such as a ferroelectric liquid crystal or an antiferroelectric liquid crystal or a bistable nematic liquid crystal may preferably be used.

In addition, a nematic liquid crystal may be used as the optical modulation substance in the present invention. In this instance, the nematic liquid crystal may be used in an optically compensated bend (OCB) mode wherein liquid crystal molecules provide a prescribed pretilt angle at boundaries with the substrates and show a bend alignment state (in which the liquid crystal molecules are oriented in a direction parallel to a normal to the substrates) at a central (intermediate) portion between the substrates. In the OCB mode, each of the pair of substrates is provided with a homogeneous alignment film subjected to a rubbing treatment in one direction. The homogeneous alignment films on the pair of substrates are arranged so that their rubbing directions are parallel or substantially parallel with each other, whereby the liquid crystal molecules at the boundaries with the substrates are placed in a splay alignment state in which the liquid crystal molecules are oriented in a direction parallel to the rubbing direction (an average rubbing direction in the case of the rubbing directions crossing each other) while keeping a prescribed pretilt angle with the corresponding substrate.

In this state, when a prescribed bend voltage is applied to the liquid crystal layer, the liquid crystal molecules at the central portion between the substrate are oriented in the direction parallel to the normal to the substrates and successively and gradually changed to a bend alignment state closer to the pretilt angle state at the boundaries with the substrates, with a decreasing distance from the substrates. This bend alignment state can be retained under application of a retention voltage lower that the above bend voltage. When a prescribed voltage higher than the retention voltage is applied to the liquid crystal layer, the liquid crystal molecules are oriented in parallel with the substrate normal direction at almost all the portions except for portions in the vicinity of the boundaries with the substrates. A switching speed from this state to the bend alignment state is high and an intermediate state therebetween may be provided by changing the applied voltage in the OCB mode.

As a result it is possible to effect gradation display by changing the applied voltage while setting the retention voltage on a lower voltage side.

The liquid crystal (optical modulation) device of the present invention may also be used as a liquid crystal device of an active matrix-type using switching elements, such as TFTs and two-terminal elements (e.g., metal-insulator-metal (MIM)).

Figure 16:
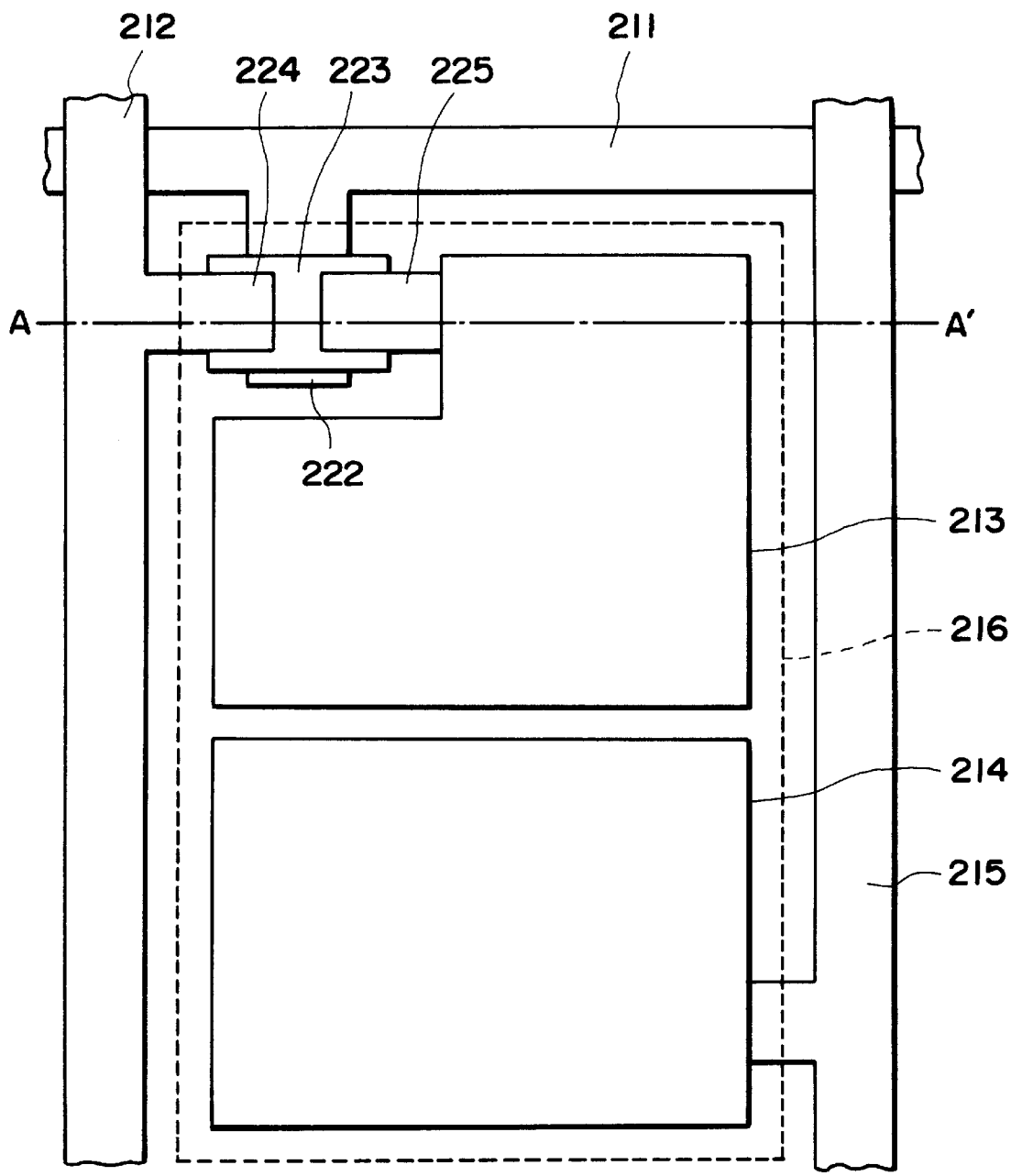
FIGS. 16, 21, 22 and 26 are schematic plan views of optical modulation devices used in Examples 13, 14, 15 and 16, respectively, wherein an electrode arrangement for one pixel is shown.
Figure 17:
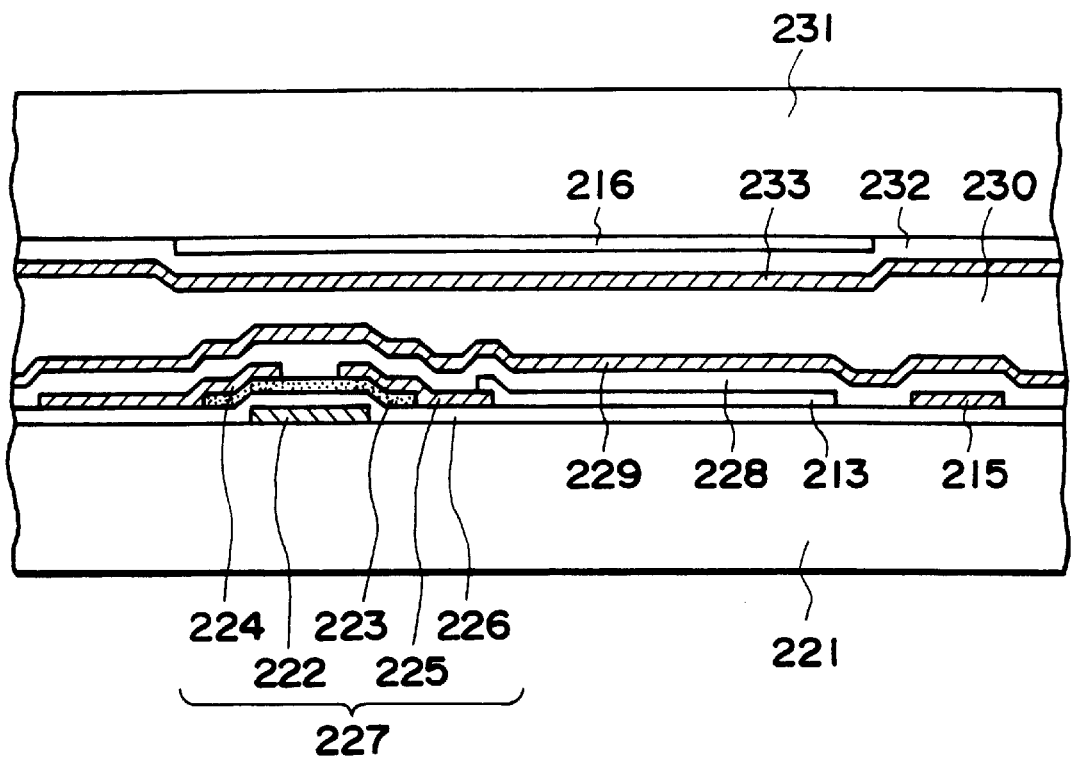
FIG. 17 is a schematic sectional view taken along an A–A' line of FIG. 16.

An embodiment of such an active matrix-type liquid crystal device of the present invention is shown in FIGS. 16 and 17.

FIG. 16 is a schematic plan view of the device wherein a principal electrode structure at one pixel portion is shown, and FIG. 17 is a corresponding cross-sectional view taken along A–A' line of FIG. 16.

Referring to FIGS. 16 and 17, for each pixel, the liquid crystal device includes: a scanning signal line 211, a data signal line 212, a first pixel electrode 213, a second pixel electrode 214, a reference voltage signal line 215, a counter electrode 216, a pair of substrates 221 and 231, a gate electrode 222, a semiconductor layer 223, a source electrode 224, a drain electrode 225, a gate insulating film 226, a TFT 227, protective film 228 and 232, alignment films 229 and 233 and a liquid crystal 230.

In the present invention, materials, shapes and forming processes for the respective structural members described above may appropriately selected and changed from those for the ordinary (active matrix-type) liquid crystal devices as long as the electrode structure formed by the electrodes 213, 214 and 216 is ensured.

In this embodiment, the TFT 227 is used as a switching element and a pixel electrode is divided into the first pixel electrode is divided into the first pixel electrode 213 and the second pixel electrode 214, thus forming plural (two) portions electrically independent of each other for one pixel.

The first pixel electrode 213 is (electrically) connected with the drain electrode 225 of the TFT 227 and is disposed opposite to the counter electrode 216 via the liquid crystal 320, thus forming a first capacitor portion having a first capacitance (C1). The second pixel electrode 214 is connected with the reference voltage signal line 215 and is disposed opposite to the counter electrode 216 via the liquid crystal 230, thus forming a second capacitor portion having a second capacitance (C2).

The counter electrodes 216 each provided to one pixel are electrically insulated (isolated) from each other to be placed in a floating state.

For each pixel, the first and second capacitor portions ar formed between the first and second pixel electrodes on the substrate 221 and the signal counter electrode 216 on the substrate 231 (constituting a common electrode), thus being in a series connection state providing the first and second capacitances (C1 and C2) applied to the TFT 227 as a load.

Figures 18A, 18B:
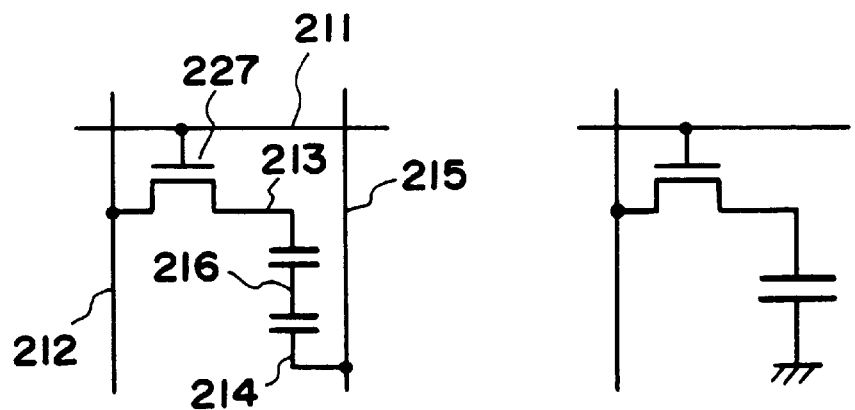
FIG. 18A is an equivalent circuit for one pixel of the optical modulation device shown in FIG. 16 used in Example 13.
FIG. 18B is an equivalent circuit for one pixel of a conventional optical modulation device.

FIG. 18A shows an equivalent circuit (for one pixel) in this embodiment and FIG. 18B shows an equivalent circuit in a conventional electrode structure having a pixel electrode having a size equal to the total size of the first and second pixel electrodes 213 and 214 and providing a prescribed capacitance (Cc) in combination with its counter electrode.

When the first and second pixel electrodes 213 and 214 have an identical size, each the first and second capacitances C1 and C2 is half of Cc (i.e., C½=C½=Cc).

Accordingly, a total load capacitance (Total) on the TFT 227 in this embodiment amounts to Cc/4 since the first and second capacitances C1 and C2 form a series circuit, thus resulting in ¼ of that in the case of the conventional electrode structure.

In this case, however, a driving voltage applied to the data signal line 212 becomes two times a driving voltage (Vc) of the conventional electrode structure.

In this embodiment, when the liquid crystal 230 is a ferroelectric liquid crystal or antiferroelectric liquid crystal having a larger particle size, in order to completely shift the entire liquid crystal molecules placed in one stable state (where dipoles of all the liquid crystal molecules are direct in one direction) to the other stable state (where the dipoles are directed in an opposite direction), an electric charge ($Q_A$) necessary for charging the first and second capacitor portions is obtained a $Q_A=C\times V=(Cc/4)\times(2Vc)=CcVc/2$ and an electric charge ($Q_B$) required for the switching (inversion) is obtained as $Q_B=2Ps\times S$ (S: electrode area)$=2Ps\times(S/2)=Ps\times S$. As a result, the electric charges ($Q_A$ and $Q_B$) are half of those in the conventional electrode structure, respectively.

Particularly, based on such an electric charge $Q_B$(for switching) being half of that in the conventional electrode structure, even when a liquid crystal material having a larger particle size (Ps) of 100 $nC/cm^2$ is used, a driving ability (capacity) necessary for the TFT is decreased to 5 times that in the case of using the TN liquid crystal.

In this embodiment, the pixel electrode is divided in plural portions (the first and second pixel electrodes in this embodiment) to provide a series circuit having plural series capacitances, whereby the resultant drive circuit is alleviated in load on the TFT to reduce the driving ability required for the TFT. As a result, an opening rate of the pixels is increased, thus realizing a bright state over the entire display (picture) area.

Figure 19:
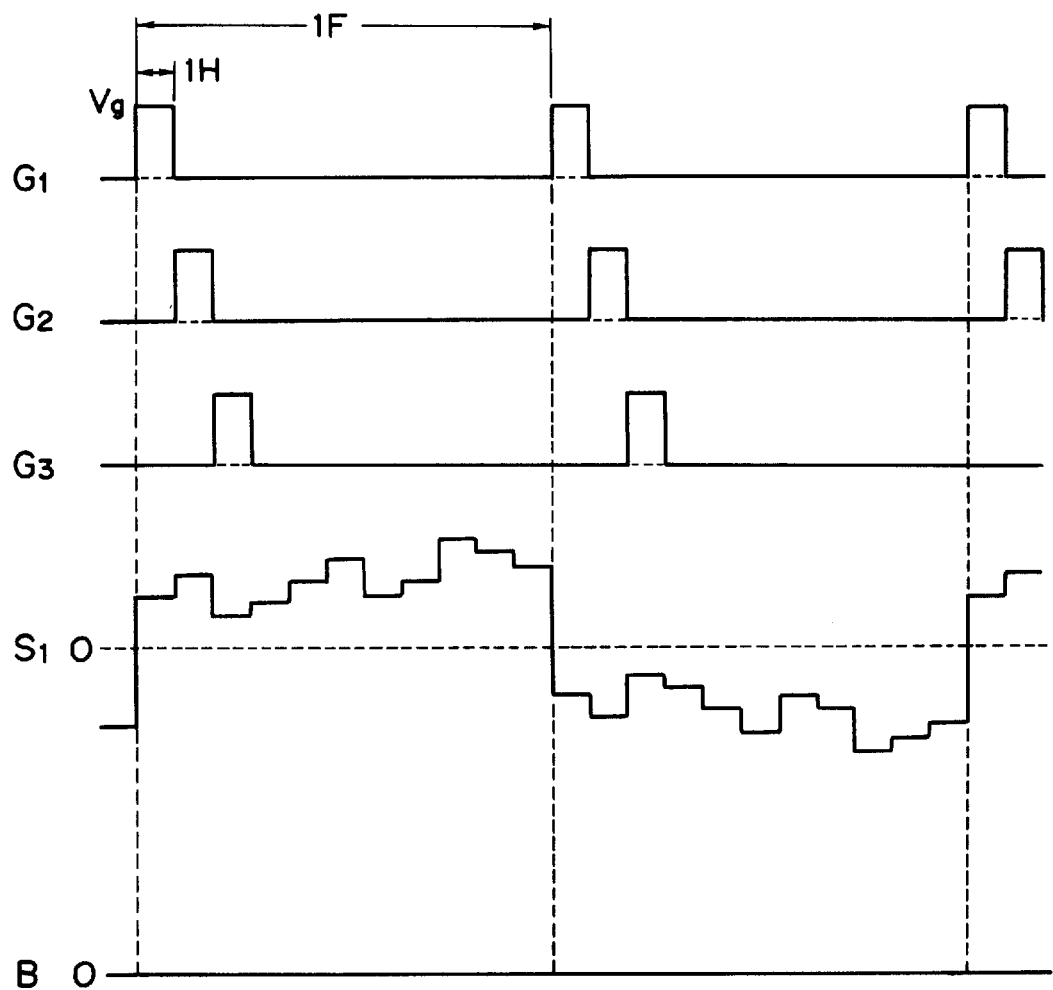
FIGS. 19 and 20 are respectively a driving timing chart for the optical modulation device used in Example 13.

FIG. 19 shows a set of drive waveforms and a timing of voltage application used in this embodiment.

Referring to FIG. 19, G1, G2 and G3 represent scanning signal voltage waveforms successively applied to the scanning signal lines and Si represents a data signal voltage waveform applied to the data signal lines. B represents a reference potential of the reference voltage signal liens. 1F represents one frame scanning period and 1H represents one (horizontal) line scanning period.

Figure 20:
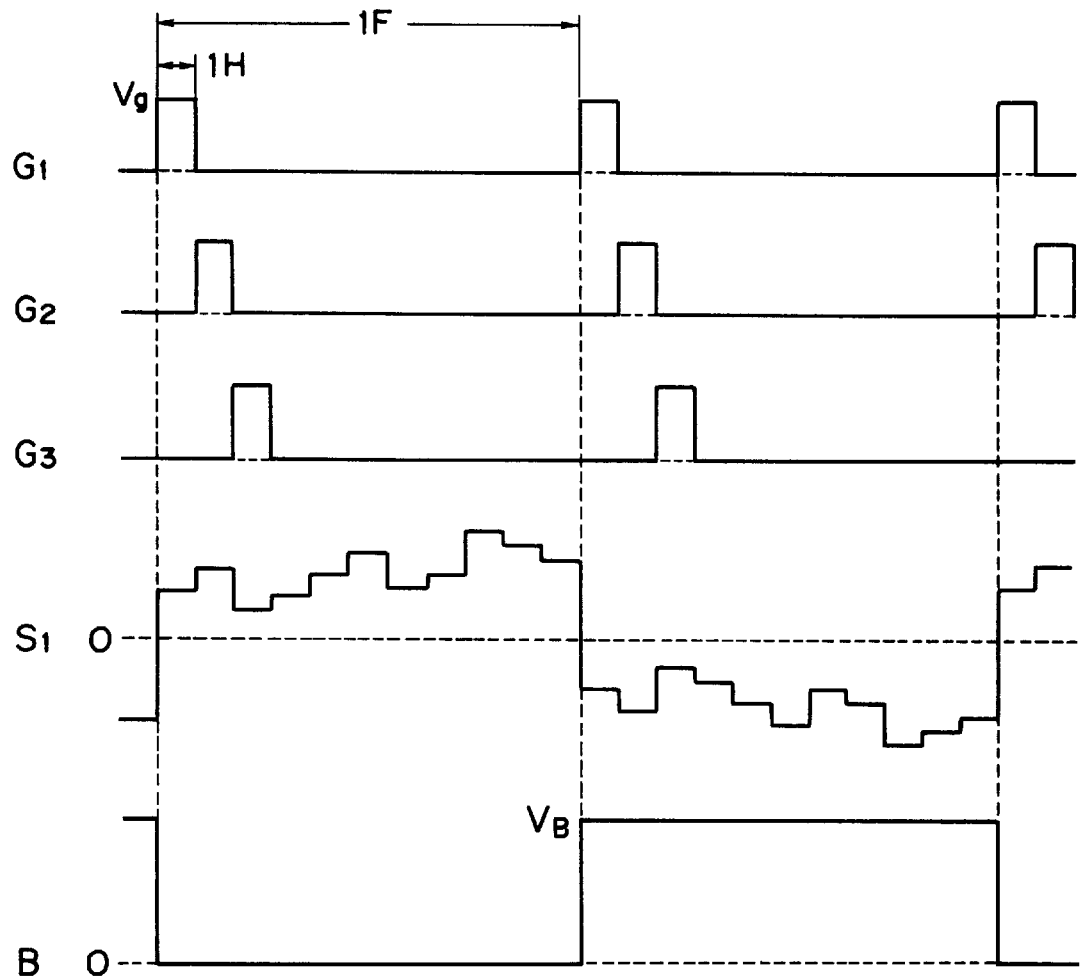

The reference potential B is set to zero volts (constant value) in this embodiment but may be changed for each frame period as shown in FIG. 20 showing another set of drive waveforms employed in a conventional polarity-inversion driving scheme.

Referring to FIGS. 19 and 20, when scanning signal lines are successively supplied with a driving voltage Vg, gates of TFTs of the pixels concerned on the scanning lines are successively turned "ON" state and depending on data signals applied to data signal lines, the respective pixels are changed with corresponding capacitances, respectively.

In this instance, when the source electrode is supplied with a potential Vs of the data signal and the reference potential is set to $V_0$, the respective capacitor portions is supplied with a voltage of $(Vs-V_0)/2$ and consume an electric charge corresponding to an amount of the particle size of the liquid crystal depending on the supplied voltage, thus changing the alignment (orientation) state of the liquid crystal molecules.

Figure 25A:
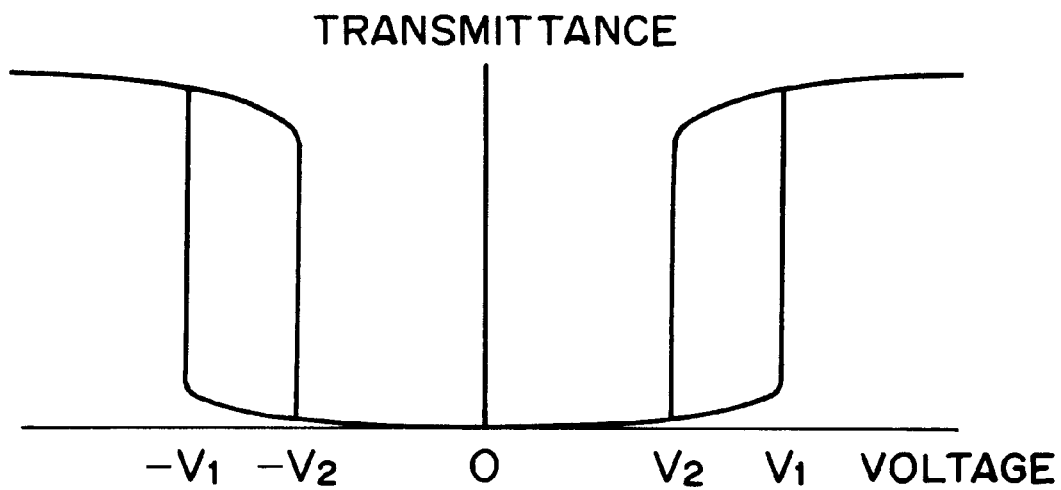
FIGS. 25A and 25B are respectively an example of a graph showing a V-T characteristic for the optical modulation device of the present invention.

When the liquid crystal device of this embodiment shows a V-T characteristic providing a hysteresis curve as shown in FIG. 25A, in order to display a bright state, an applied voltage of at least a first threshold value ($+V_1$ or $-V_1$) (as absolute value) is set as $(Vs-V_0)/2$. On the other hand, in order to display a dark state, an applied voltage of at most a second threshold value ($+V_2$ or $-V_2$) (as absolute value) is set as $(Vs-V_0)/2$.

Figure 25B:
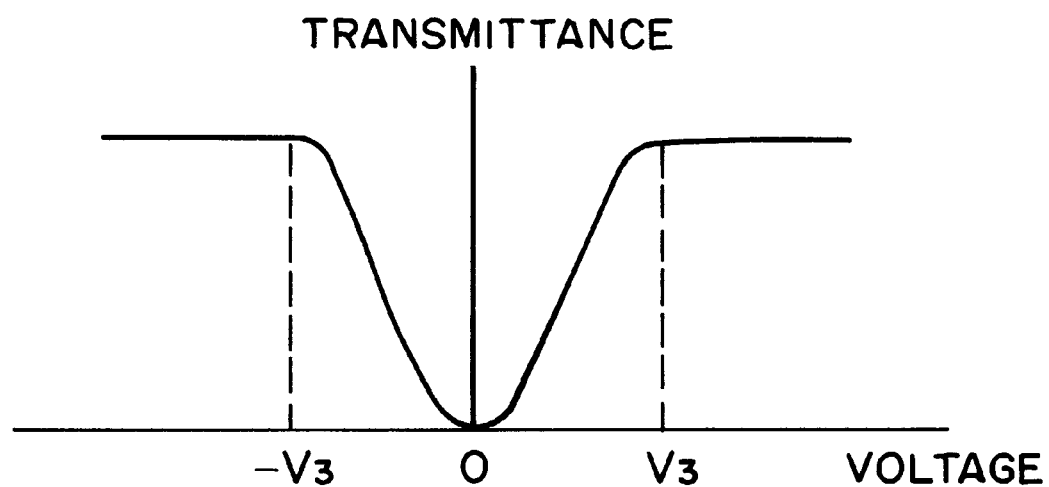

When the liquid crystal device shows a V-T characteristic as shown in FIG. 25B, an applied voltage of at most a saturation threshold value ($+V_3$ or $-V_3$) (as absolute value) is appropriately set as $(Vs-V_0)/2$ depending on a desired gradation level.

In this embodiment employing the first and second pixel electrodes for one pixel providing the plural capacitances in the series connection state, a first region of the liquid crystal 230 on the first pixel electrode 213 and a second region of the liquid crystal 230 on the second pixel electrode 214 are supplied with opposite electric fields in polarity, respectively.

In the case of the antiferroelectric liquid crystal, an optical axis thereof in a bright state may be opposite tilted based on a smectic layer axis direction to provide two states which are alternately switched for a prescribed period, thus effecting an alternating voltage (electric field) driving.

In this case, however, flickering is caused to occur in some cases. In order to prevent the flickering, there has been proposed a so-called "1H-inversion driving method" wherein a polarity of a driving voltage is switched for one (scanning) line as described in JP-A 4-182694.

However, if the 1H-inversion driving method is adopted in the conventional (ordinary) active matrix-type liquid crystal device, positive and negative source voltages are required to be applied alternately thereto due to the use of a common counter electrode, thus requiring a source (data signal) driver IC having a high-voltage output.

On the other hand, in the active matrix-type liquid crystal device according to the present invention used in this embodiment, the positive and negative voltages (electric fields) are present in one pixel. As a result, it is not necessary to employ the 1H-inversion driving method, thus facilitating the use of a lower-voltage source driver IC.

Figure 21:
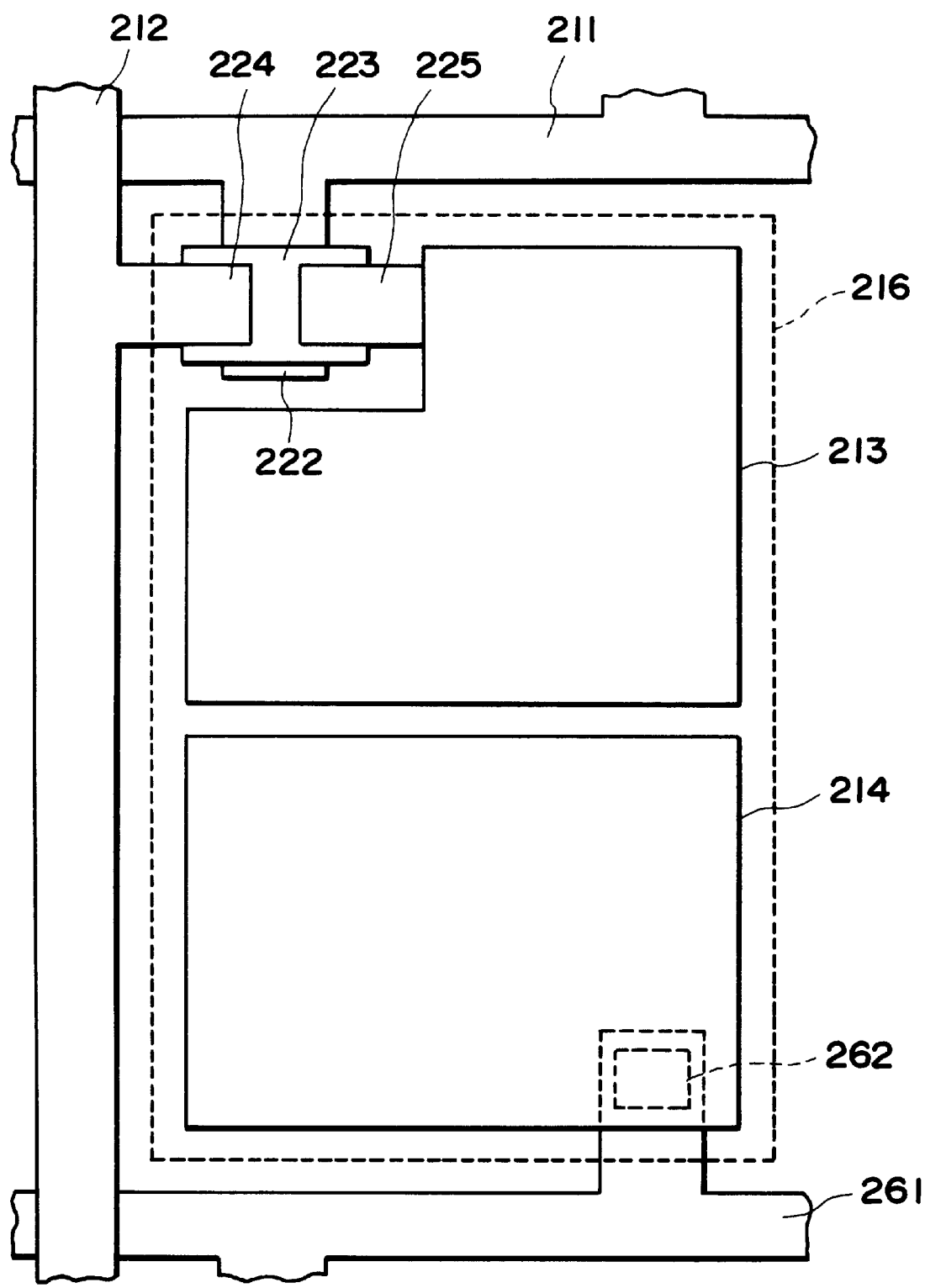

As a modification example of this embodiment (FIGS. 16–20) wherein a reference potential is supplied from the reference voltage signal line 215 disposed in parallel with the data signal line 212, it is possible to use an adjacent scanning signal line (261 as shown in FIG. 21) instead of the reference voltage signal line 215. Referring to FIG. 21, the adjacent scanning signal line 261 is electrically connected with the second pixel electrode via a contact hole 262 provided to the gate insulating film.

In this modification example, the reference potential corresponds to a non-selection scanning signal potential but may be alternately changed for prescribed period as shown as "B" in FIG. 20 within an extent not placing the gate in an "ON" state, as desired.

Figure 22:
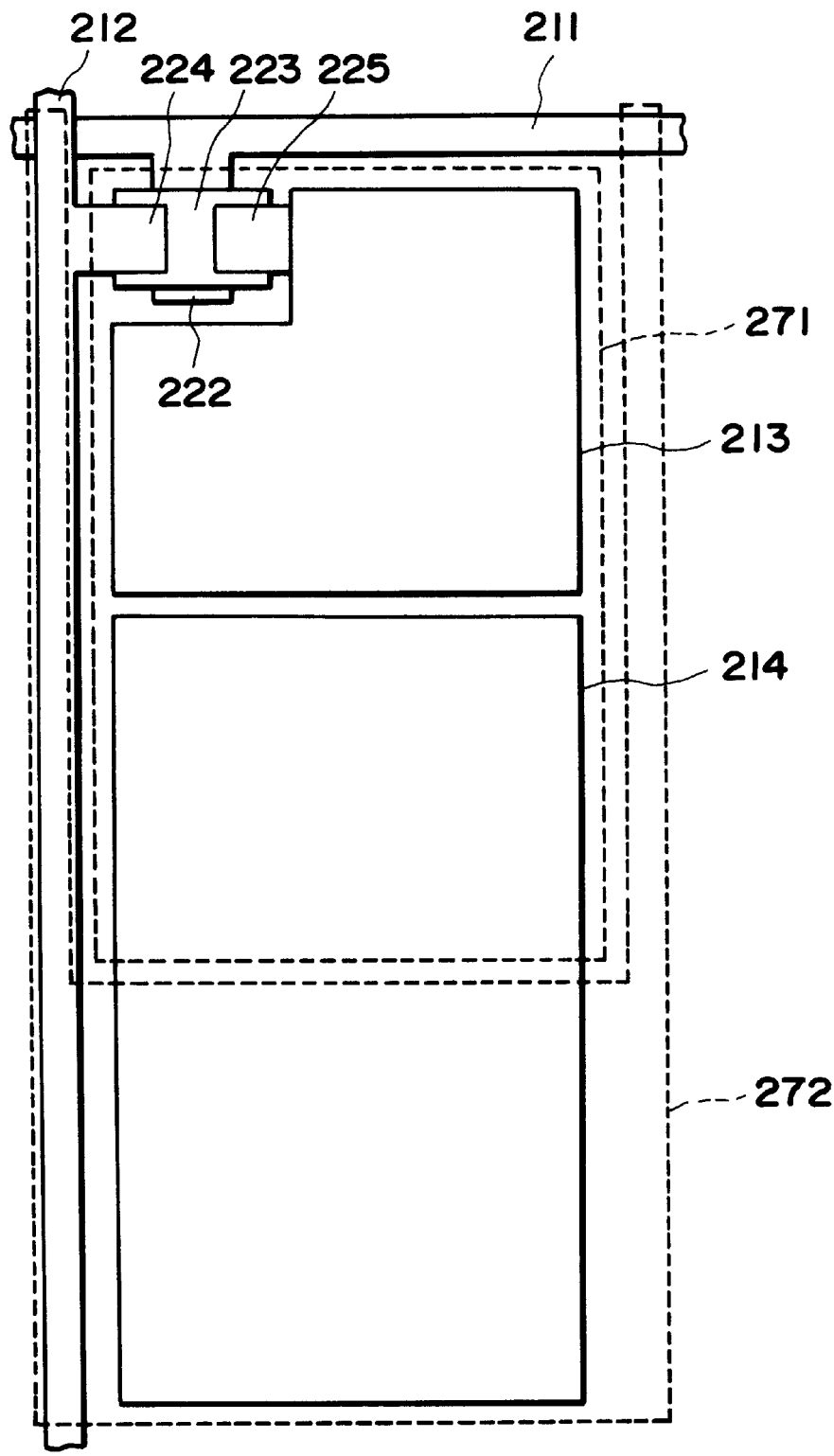

Another modification example is shown in FIG. 22.

Referring to FIG. 22, the pixel electrode is divided in a first pixel electrode 213 and a second pixel electrode 214 providing an areal ratio (213:214) of 1:2 and the counter electrode is also divided in a first counter electrode 271 and a second counter electrode 272 providing an areal ratio (271:272) of 2:1. As a result, the first and second pixel electrodes 213 and 214 and the first and second counter electrodes 271 and 272 provide a series circuit for three capacitor portions (having three capacitances) for each pixel.

Figure 23:
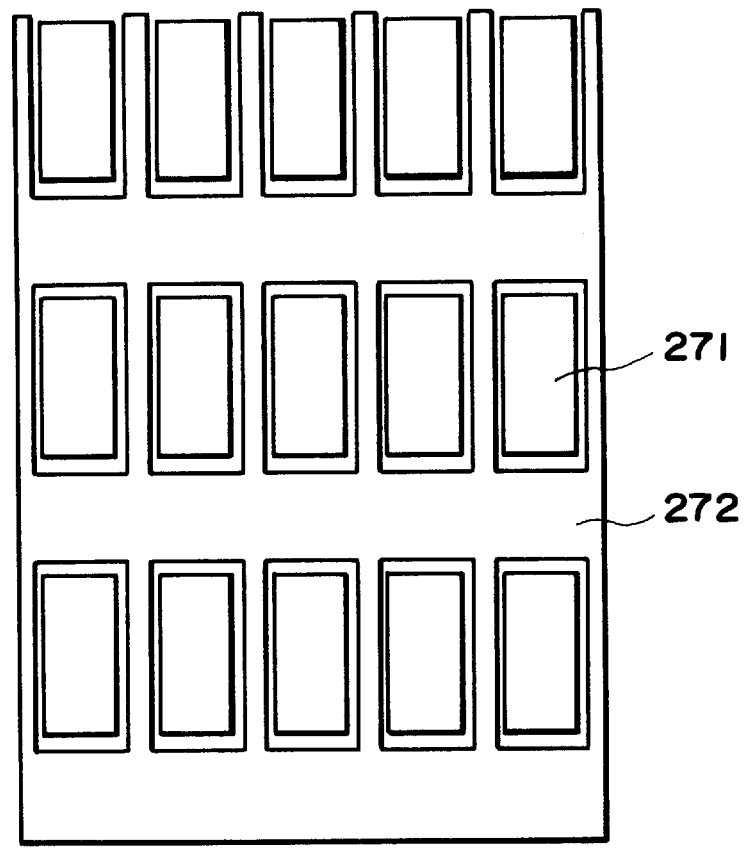
FIG. 23 is a schematic plan view showing a counter electrode arrangement employed in Example 15.

Specifically, the second pixel electrode 214 and the first counter electrode 271 (disposed opposite to the first pixel electrode 213 and half of the second pixel electrode 214) are placed in a floating state, respectively, thus being not electrically connected with an signal lines. The second counter electrode 272 is common to all the pixels as shown in FIG. 23 (where the first counter electrodes 271 are arranged to provide 3×5 portions) and is electrically connected with an external reference potential terminal (not shown).

Figure 24:
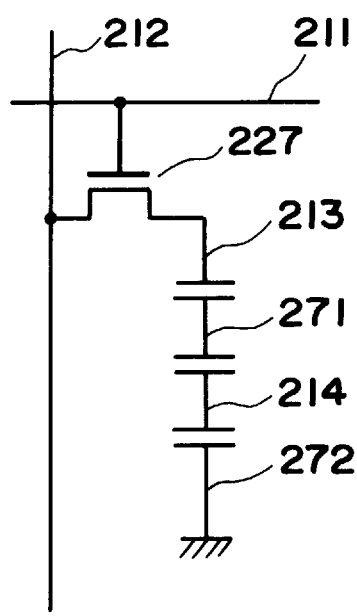
FIG. 24 is an equivalent circuit for one pixel of the optical modulation device used in Example 15.

FIG. 24 shows an equivalent circuit for one pixel in this modification example.

Referring to FIG. 24, the reference potential is set to ground potential but may be appropriately changed as desired an also changed alternately for a prescribed period as shown in FIG. 20.

In this modification example, each of the three capacitance portions has an area of ⅓ of each pixel, thus reducing a necessity electric change to be charged ($Q_A$) and a necessary inversion electric charge ($Q_B$) for switching to ⅓ of those, respectively, in the conventional electrode structure.

Accordingly, a necessary driving ability for the switching elements (TFTs) is also lowered to ⅓.

In this modification example, however, the amplitude of the data signal voltage is required to increase to three times that in the conventional electrode structure but such a problem of the increased data signal voltage can be remedied by increasing a source voltage of a source drier to provide a higher withstand voltage to the driver IC.

Hereinbelow, the present invention will be described more specifically based on Examples with reference to the figures.

EXAMPLE 1

A ferroelectric liquid crystal device as shown in FIG. 1 was prepared in the following manner.

A 1.1 mm-thick glass substrate (11) was coated with a 70 nm-thick ITO film by sputtering without heating the substrate, followed by patterning to form a plurality of counter electrodes (common electrodes) (17) (each size= 100×130 $\mu$m) as shown in FIG. 4B.

On another 1.1 mm-thick glass substrate (1), 1.5 $\mu$m-thick color filters (13) of red (R) (13a), green (G) (13b) and blue (B) (13c) were successively formed and a 2000 Å-thick black matrix (12) of Mo-Ta alloy (width=20 $\mu$m) was formed between the color filters (13a, 13b and 13c).

On the color filters (13) and the black matrix (12), a 1.5 $\mu$m-thick protective layer (14) was formed by using a polymer solution ("PA-1000C", mfd. by Ube Kosan K.K.; polymer content=10 wt. %; solvent=N-methyl-2-pyrrolidone).

The protective layer (14) was coated with a 200 nm-thick layer of MoTa alloy by sputtering, followed by patterning with an acid mixture of nitric acid/acetic acid/phosphoric acid to form lower metal electrodes (2 and 5) (width=8 $\mu$m) as shown in FIG. 7A. On the lower metal electrodes (2 and 5), a 1 $\mu$m-thick Cu layer was formed by sputtering and was patterned with a cupric chloride solution to form upper metal electrodes (3 and 6) (width=8 $\mu$m) as shown in FIG. 7B.

On the protective layer (14) provided with the metal electrodes (2, 3, 5 and 6), a resin layer (8) was formed by an acylic UV-curable through a method as described in JP-A 8-76101.

More specifically, after effecting ozone treatment for 5 min. by UV light irradiation, a 3.75%-solution of silane coupling agent ("A-174", mfd. by Nippon Unicar K.K.) in IPA (isopropyl alcohol) was applied by spin coating and was heated for 20 min. at 100° C. to effect adhesive treatment. The thus treated substrate (1) was heated for 20 min. at 60°

C. in an oven together with a smoothing glass plate and a impresser containing an acrylic UV-curable resin composition (pentaerythritol triacrylate/neopentyl glycol diacrylate/hydroxycyclohexyl phenyl ketone=50/50/2 by weight).

After taken out from the oven, the acrylic UV-curable resin composition was added dropwise on the glass substrate (1) provided with the metal electrodes (2, 3, 5 and 6) and immediately thereafter the smoothing glass plate was superposed thereon, followed by pressing with a pressing machine (pressure=20 kg/cm$^2$ pressing time=3 min., pressing temperature=60° C.). The pressing operation was started after 2 min. from the superposition of the smoothing glass plate.

Thereafter, the UV-curable resin composition between the glass substrate (1) and the smoothing glass plate was subjected to UV light irradiation (light energy=200 mJ/cm$^2$, center wavelength=365 nm to cure the UV-curable resin composition).

The smoothing glass plate was removed from the glass substrate (1) by using a release means and the resulting glass substrate (1) was subjected to ultrasonic cleaning (washing) in an IPA solution, thus removing an uncured UV-curable resin composition to obtain a UV resin layer (8) as shown in FIG. 7C wherein the metal electrodes (2, 3, 5 and 6) were embedded.

On the UV resin layer (8), a 70 nm-thick ITO layer was formed by sputtering, followed by patterning while forming electrical connection as shown in FIGS. 6A–6D to form a plurality of data electrodes (7) (each size=100×60 μm for rectangular portion) and a plurality of scanning electrodes (4) (each size=100×60 μm) arranged in an electrode matrix as shown in FIG. 4A.

These electrodes (4 and 7) were coated with a 10 nm-thick polyimide alignment film (9) and was rubbed in a first direction.

Thereafter, a portion of the alignment film (9) on the scanning electrodes 4 was masked with a resist (81) as shown in FIG. 8, followed by rubbing treatment in a second direction forming an angle of 2θ (θ: tilt angle) with the first direction.

On the other hand, the glass substrate (11) provided with the counter electrodes (17) was coated with a 10 nm-thick polyimide alignment film (19) and was subjected to two times of a rubbing treatment in the same manner as in the alignment film (9) (on the substrate (1)) so that the respective corresponding portions of the alignment film (19) have the same rubbing directions a the alignment film (9).

The thus treated glass substrates (1 and 11) were applied to each other via SiO$_2$ spacer beads (average diameter=ca. 2.3 μm) and adhesive beads of epoxy resin (average diameter=5 μm) by using a sealing agent (51) (epoxy adhesive) while leaving a liquid crystal injection port (52) as shown in FIG. 5 to provide a blank cell having a cell gap of 2.1 μm.

A chiral smectic (ferroelectric) liquid crystal composition was prepared by mixing the following compounds in the indicated proportions and was injected into the cell gap of the blank cell from the injection port (52) at 100° C. to prepare a (chiral smectic) liquid crystal device.

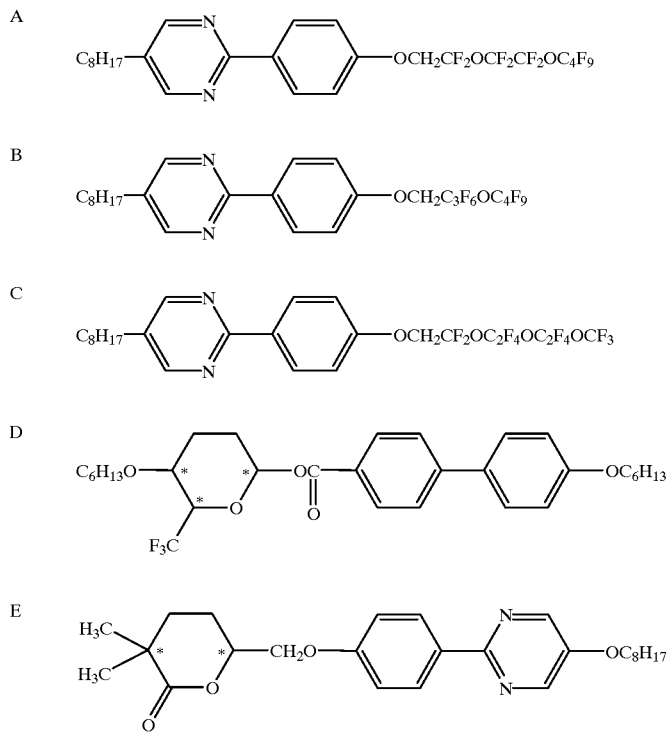

Whight ratio: A/B/C/D/E=45/15/30/5/2
Phase trandition temperatures (° C.).

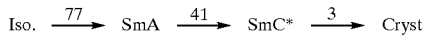

Tilt angle (30° C.): θ=24.4 degrees
Spontaneous polarization (30° C.):
Ps=−31.1 nC/cm$^2$ The tilt angle θ and spontaneous polarization Ps referred to herein were based on values measured according to the following methods.

Measurement of Tilt Angle θ

A liquid crystal device was sandwiched between right angle-cross nicol polarizers and rotated horizontally relative to the polarizers under application of an AC voltage of ±30 V to ±50 V and 1 to 100 Hz between a pair of substrates of the device while measuring a transmittance through the device by a photomultiplier (available from Hamamatsu Photonics K.K.) to find a first extinct position (a position providing the lowest transmittance) and a second extinct position. A tilt angle θ was measured as a half of the angle between the first and second extinct positions.

Measurement of Spontaneous Polarization Ps

The spontaneous polarization Ps was measured according to "Direct Method with Triangular Waves for Measuring Spontaneous Polarization in Ferroelectric Liquid Crystal", as described by K. Miyasato et al (Japanese J. Appl. Phys. 22, No. 10, L661 (1983)).

The thus prepared liquid crystal device was driven at 38° C. by using drive waveforms as shown in FIGS. 9A–9C (FIG. 9A: scanning signal waveform; FIGS. 9B and 9C: data signal waveforms) under driving conditions including: $V_1$=21.0 volts, $V_2$=−21.0 volts, $V_3$=9.0 volts, $V_4$=−9.0 volts, $V_5$=9.0 volts and pulse width (ΔT)=9.3 μm, whereby a good driving state was confirmed.

Then, when the liquid crystal device was driven under other conditions including: $V_1$=29.0 volts, $V_2$=−29.0 volts, $V_3$=12.0 volts, $V_4$=−12.0 volts, $V_5$=12.0 volts and pulse width (ΔT)=7.0 μsec, the device also showed a good driving state.

EXAMPLE 2

In this example a (bistable) nematic liquid crystal device (as specifically described in JP-A 1-151818 and JP-A 6-230751) was prepared by using a nematic liquid crystal composition showing bistability comprising a nematic liquid crystal ("KN-4000", mfd. by Chisso K.K.) and an optically active substance. The nematic liquid crystal composition had a helical pitch of 3.4 μm.

A blank cell for the nematic liquid crystal device was prepared in the same manner as in Example 1 except that each of the alignment films (9 and 19) were changed to a 20 nm-thick polyimide alignment film ("SE3140", mfd. by Nissan Kagaku K.K.) and was subjected to rubbing treatment in one direction (a center (or average) direction of the first and second directions) so that the rubbing directions for the alignment films (9 and 19) were parallel with each other and opposite to each other.

The nematic liquid crystal composition was filled in the blank cell to prepare a nematic liquid crystal device.

The nematic liquid crystal device provided a pretilt angle of about 4 degrees as measured by the crystal rotation method as described in Jpn. J. Appl. Phys., vol. 19 (1980), No. 10, Short Notes 2031.

Figure 10A:
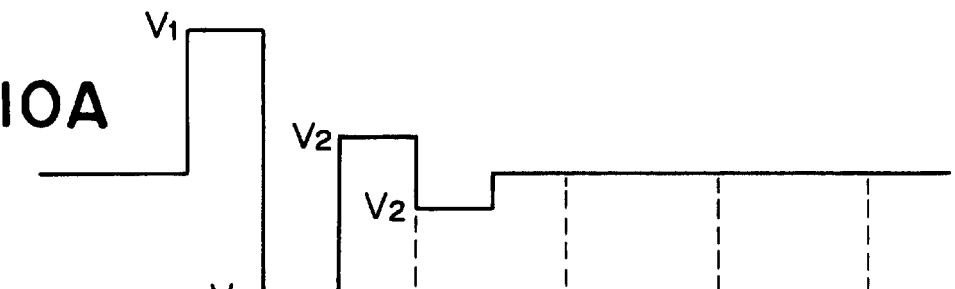
Figure 10B:
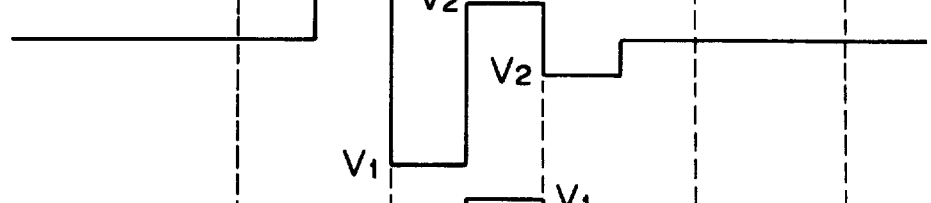
Figure 10C:
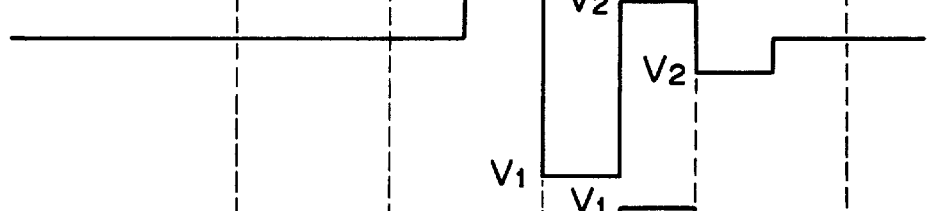
Figure 10D:
Figure 10E:
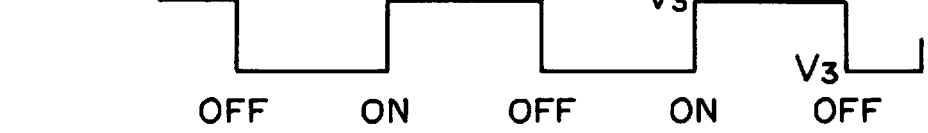

The nematic liquid crystal device was driven at 30° C. by using drive waveforms as shown in FIGS. 10A–10E (FIG. 10A to 10D: scanning signal waveforms applied to scanning signal lines; FIG. 10E: data signal waveform applied to data signal lines) under driving conditions including: $V_1$ (reset pulse voltage)=±20 volts, $V_2$ (writing voltage)=±2.5 volts, and $V_3$ (data signal voltage)=±1.5 volts, whereby a good display state free from crosstalks was obtained.

EXAMPLE 3

An antiferroelectric liquid crystal device was prepared in the same manner as in Example 1 except that the chiral smectic liquid crystal composition was changed to an antiferroelectric liquid crystal material ("CS4000", mfd. by Chisso K.K.); the cell gap was set to 1.5 μm for stably realizing ferroelectric and antiferroelectric alignment states by suppressing the formation of helical structure; and the alignment films (9 and 19) were changed to those of polyimide ("LP-64", mfd. by Toray K.K.) and subjected to a rubbing treatment in the same manner as in Example 2 (i.e., antiparallel rubbing state).

Figure 11A:
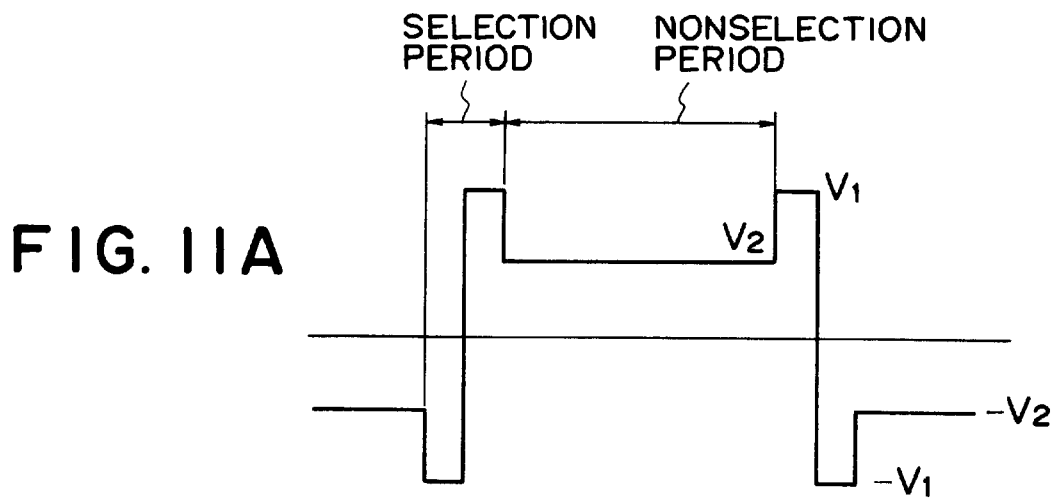
Figure 11B:
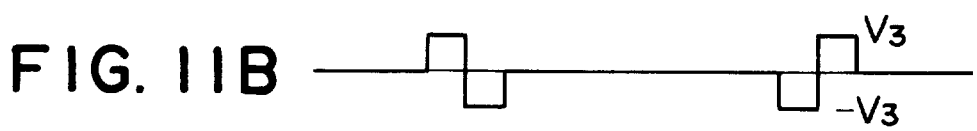
Figure 11C:
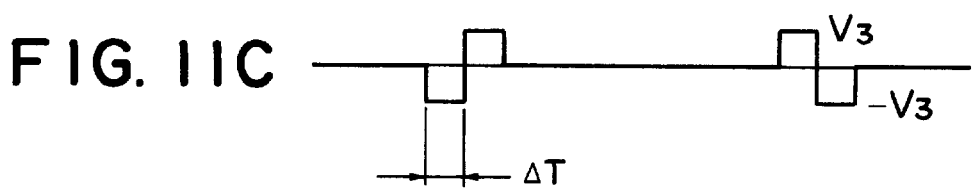

When the thus prepared antiferroelectric liquid crystal device was driven at 30° C. by using drive waveforms as shown in FIGS. 11A–11C (FIG. 11A: scanning signal waveform applied to scanning signal line; FIGS. 11B and 11C: data signal waveforms applied to data signal lines) under driving conditions including: $V_1$=20 volts, $V_2$=12 volts, $V_3$=4 volts and pulse width (ΔT)=250 μsec, good quality images were displayed.

EXAMPLE 4

Chiral smectic (ferroelectric) liquid crystal devices were prepared in the same manner as in Example 1 except that the alignment film (19) on the counter electrodes (17) was changed to fine 200 nm-thick electroconductive alignment films having different sheet resistances (as shown in Table 1 below) and surface energies of 27–35 dyne/cm$^2$ and each comprising a film of silicone resin containing Sb-doped tin oxide particles (average diameter=5–10 nm).

The chiral smectic liquid crystal devices were driven at 30° C. by using the drive waveforms as shown in FIGS. 9A–9C ($V_1$=30.0 volts, $V_2$=−30.0 volts, $V_3$=12.0 volts, $V_4$=−12.0 volts, $V_5$=12.0 volts and pulse width (ΔT)=22.4 μsec).

The results are shown in Table 1 together with sheet resistances for the respective alignment films (19) used.

TABLE 1

| Device No. | Sheet resistance (ohm/□) | Driving state* |
|---|---|---|
| 1 | 1 × 10$^{11}$ | A |
| 2 | 5 × 10$^{11}$ | A |
| 3 | 1 × 10$^{13}$ | A |
| 4 | 5 × 10$^{13}$ | B |
| 5 | ≧1 × 10$^4$ | C |

*: "A" represented a good driving state, "B" represented a driving state of a practically acceptable level although a minute inversion failure portion occurred, and "C" represented a driving failure (incomplete inversion).

Herein, the sheet resistance was measured in a film extension direction according to a resistance-measuring method as described in JP-A 8-262477 (with reference to its FIG. 7).

EXAMPLE 5

Figure 12:
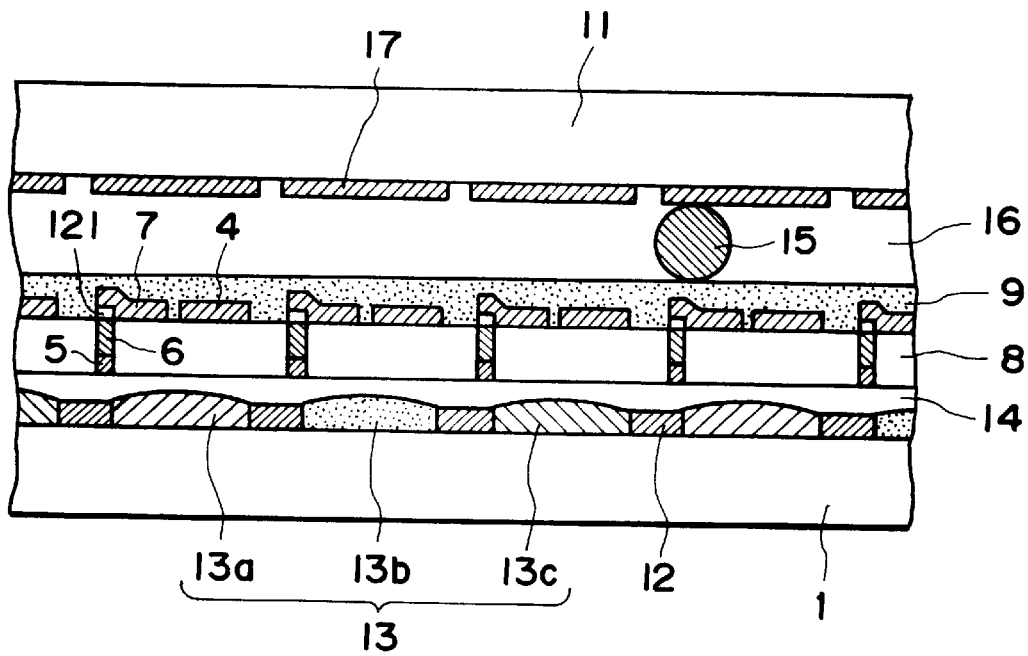
FIGS. 12, 13 and 15 are schematic sectional views of optical modulation devices used in Examples 5, 10 and 9, respectively.

A chiral smectic liquid crystal device as shown in FIG. 12 was prepared in the same manner as in Example 1 except that: (i) data electrodes (7), scanning electrodes (4) and counter electrodes (17) were formed of a film of silicone resin containing Sb-doped tin oxide particles (sheet resistance=$1\times10^8$ ohm/□) similar to those for the electroconductive alignment film (19) used in Example 4; (ii) the alignment film (19) (used in Example 1) was not used; and (iii) each data electrode 7 was provided with a 200 nm-thick Culayer (auxiliary electrodes 121.).

The respective electrodes (4, 7 and 17) were formed by a rift-off method using a resist pattern, thus avoiding expensive ITO film formation (vacuum sputtering and etching processes).

By the use of the auxiliary Cu electrodes (121), it became possible to reduce a propagation delay of a data signal waveform (applied to the data electrodes 7) to about 1/50 of that in the case of Example 1, thus effecting a good image display.

EXAMPLE 6

A nematic liquid crystal device was prepared and driven in the same manner as in Example 4 except that the modifications in Example 2 (with respect to Example 1) were adopted and an electroconductive alignment film (19) having a sheet resistance of $5\times10^{11}$ ohm/□ was used.

As a result, it was possible to display desired images with good image qualities without causing crosstalks.

EXAMPLE 7

An antiferroelectric liquid crystal device was prepared and driven in the same manner as in Example 4 except that (i) the modifications in Example 3 (with respect to Example 1) were adopted, (ii) the thickness of the alignment film (9) was changed to 6 nm, and (iii) an electroconductive alignment film (19) having a sheet resistance of $5\times10^{11}$ ohm/□ was used.

As a result, a good driving state was confirmed.

EXAMPLE 8

A chiral smectic liquid crystal device (as shown in FIG. 1) was prepared and driven in the same manner as in Example 1 except that the glass substrate (11) was changed to a resin substrate (11), and counter electrodes (17) and an alignment film (19) were formed in the following manner.

A 0.1 mm-thick polyester film (11) (resin substrate) was coated with a 70 nm-thick ITO film by sputtering with no substrate heating, followed by patterning to obtain a plurality of counter electrodes (17) similarly as in Example 1. The counter electrodes (17) were coated with a 200 nm-thick electroconductive alignment film (19) of a film of silicone resin containing Sb-doped tin oxide particles (average diameter=5–10 nm). The alignment film had a surface energy of 27–35 dyn/cm and a sheet resistance of $5\times10^{11}$ ohm/□.

As a result, the liquid crystal device was found to provide a good driving state.

EXAMPLE 9

Figure 15:
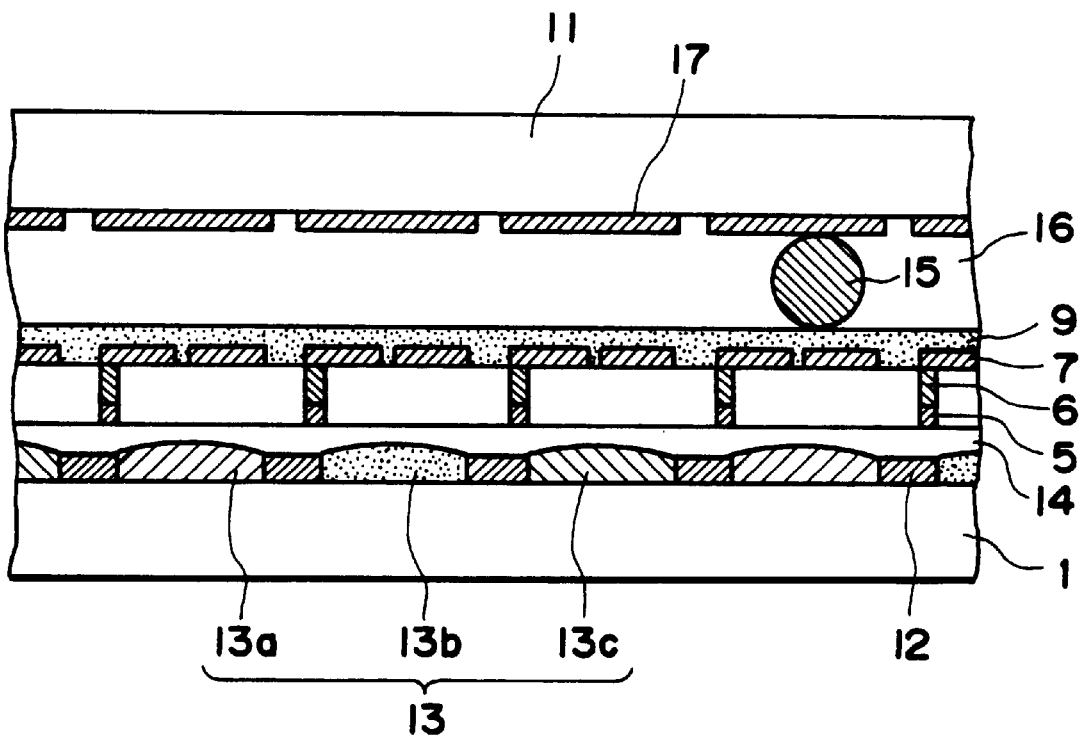

A chiral smectic liquid crystal device (as shown in FIG. 15) was prepared and driven in the same manner as in Example 1 except that (i) the glass substrate (11) was changed to a resin substrate (11), (ii) the alignment film (19) and the epoxy adhesive beads were not used, and (iii) counter electrodes (17) were formed in the following manner.

A 0.1 mm-thick polyester film (11) (resin substrate) was coated with a negative photoresist having a pattern corresponding to spacings between counter electrodes (17) to be formed, and thereon a solution of a silicone oxide matrix containing SnOx fine particles (average diameter=60 nm) was applied by spin coating, followed by baking at 120° C. to form a 40 nm-thick electroconductive inorganic film. The photoresist was removed from the polyester film (11) to obtain a plurality of counter electrodes (17) of the electroconductive inorganic film, which showed a surface energy of 27–35 dyne/cm and a sheet resistance of $6\times10^8$ ohm/□.

The chiral smectic liquid crystal device did not cause alignment defects due to disorder (breakage) of liquid crystal molecular alignment through processes including a cell preparation, a liquid crystal injection and driving of the cell (device).

EXAMPLE 10

Figure 13:
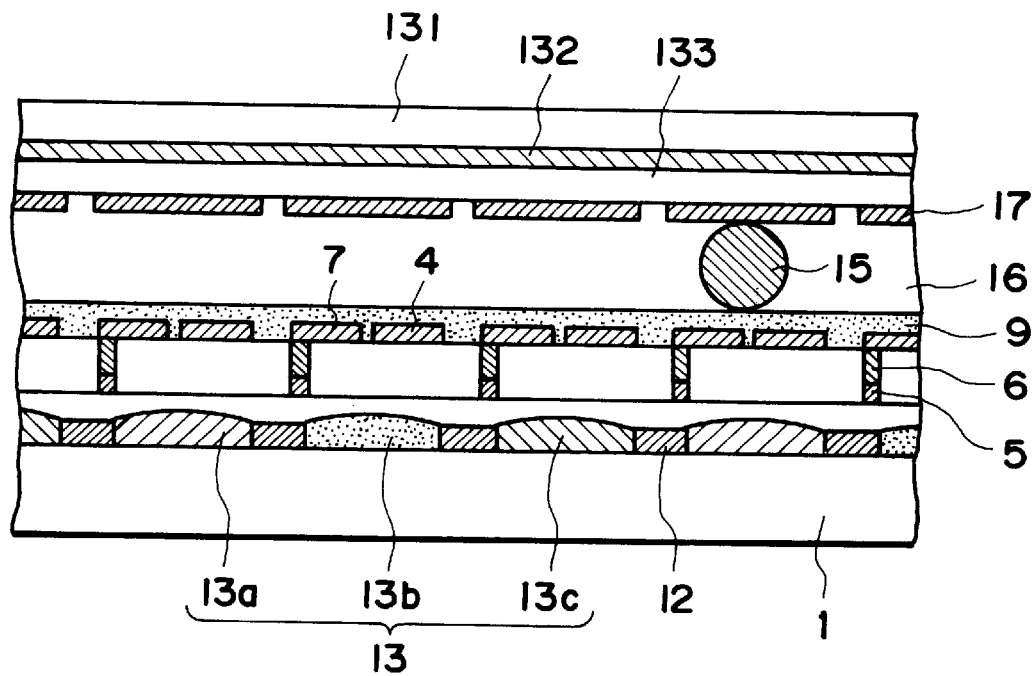
Figure 14:
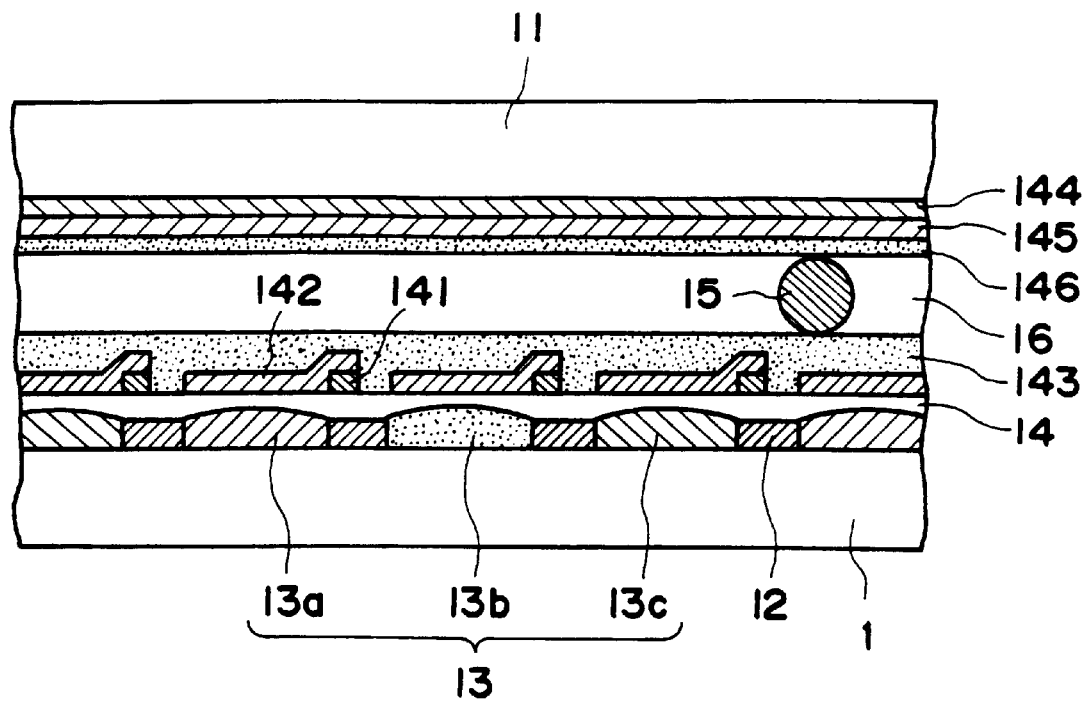
FIG. 14 is a schematic sectional view of an embodiment of a conventional optical modulation device.

In this example, a chiral smectic liquid crystal device as shown in FIG. 13 wherein a polarizing plate comprising a stretched PVA (polyvinyl alcohol) film (132) and resin substrates (131 and 133) sandwiching the PVA film (132) was used as a substrate provided with counter electrodes (17).

The chiral smectic liquid crystal device was prepared and driven in the same manner as in Example 8 except that the resin substrate (11) was charged to a polarizing plate (131, 132 and 133) formed in the following manner and the alignment film (19) was not used.

The polarizing plate was formed by sandwiching a 20 μm-thick stretched PVA film (132) dyed with iodine between a pair of 100 μm-thick protective films (131 and 133) of triacetate each via a 1 μm-thick adhesive layer (not shown in FIG. 13).

The protective films (131 and 133) may be formed by polyester.

In this example, the liquid crystal injection was set to 90° C. in view of a heat resistance in terms of optical characteristics of the polarizing plate (although the heat-resistant temperature of the polarizing plate was expected to be at least 100° C.).

As a result of the drive of the device, good display images were obtained.

According to this example, the polarizing plate was used as one of the pair of substrates, whereby substantial reduction in device weight and production cots was achieved.

EXAMPLE 11

A nematic liquid crystal device was prepared and driven in the same manner as in Example 8 except that the modifications in Example 2 (with respect to Example 1) were adopted and an electroconductive alignment film (19) having a sheet resistance of $5\times10^{11}$ ohm/□ was used.

As a result, it was possible to display desired images with good image qualities without causing crosstalks.

EXAMPLE 12

An antiferroelectric liquid crystal device was prepared and driven in the same manner as in Example 8 except that (i) the modifications in Example 3 (with respect to Example 1) were adopted, and (ii) an electroconductive alignment film (19) having a sheet resistance of $5\times10^{11}$ ohm/□ was used.

As a result, a good driving state was confirmed.

EXAMPLE 13

An active matrix-type chiral smectic (ferroelectric) liquid crystal device having a structure as shown in FIGS. 16 and 17 was prepared by using a chiral smectic liquid crystal composition with no smectic A phase.

The chiral smectic liquid crystal composition was prepared by mixing the following compounds in the indicated proportions.

| Structural formula | wt. parts |
|---|---|
| 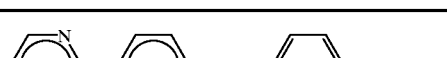 | 5 |
|  | 90 |
| 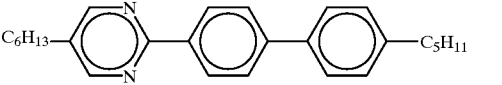 | 5 |

The chiral smectic liquid crystal composition showed the following phase transition series.

Phase transition temperature (° C.)

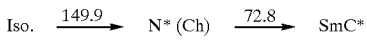

Figure 26:
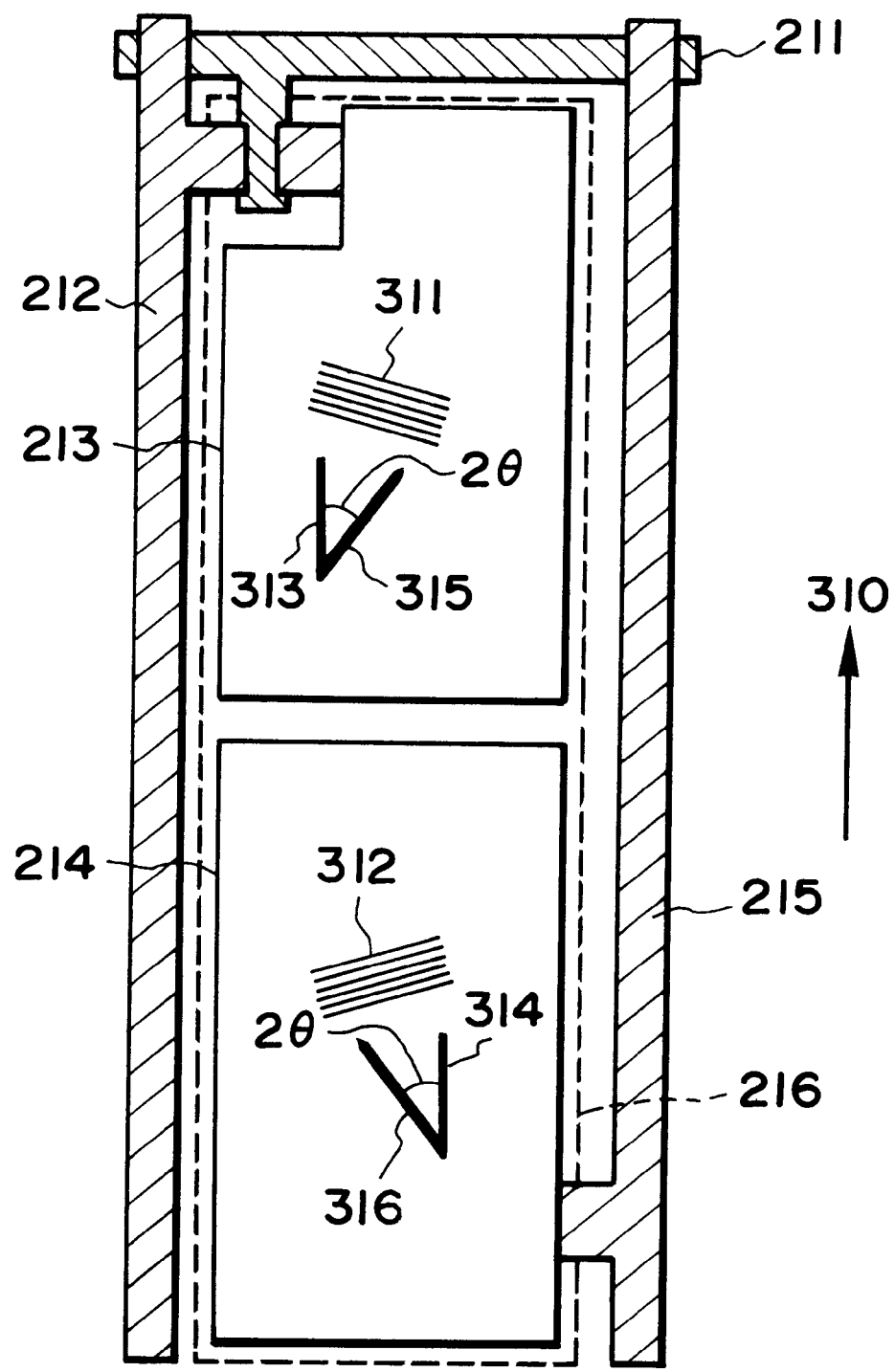

The chiral smectic liquid crystal composition does not show smectic A phase. Such a liquid crystal material forms smectic (molecular) layers 311 and 312 as shown in FIG. 26, the respective smectic layers 311 and 132 are oppositely tilted each other from a rubbing direction 310 in SmC* (chiral smectic C phase) so that each normal to the smectic layers (311 or 312) form an angle corresponding to a tilt angle (θ) with the rubbing direction.

In this example, the smectic layers 311 were provided when supplied with an electric field upward in a direction perpendicular to the drawing, and the smectic layers 312 were provided when supplied with an electric field downward in the direction (opposite to that for the smectic layers 311).

Specifically, when the gate of the TFT was opened at a temperature in the vicinity of the phase transition temperature from N* phase to SmC* phase and a voltage of +12 volts was applied to the source signal line, the entire liquid crystal molecules on the first pixel electrode 213 formed the smectic layer structure 311 and those on the second pixel electrode 214 formed the smectic layer structure 312 to complete an initial alignment state in SmC* phase.

In the thus treated liquid crystal device (cell), the liquid crystal molecules provide first states 313 and 314 parallel to the rubbing direction 310 under application of a positive (+) voltage to the first electrode 211 connected with the TFT and provide second states 315 and 316 each tilted from the rubbing direction by 2θ (θ: tilt angle) under application of a negative (-) voltage thereto. As a result, the second states 315 and 316 form an angle of 4θ therebetween.

The liquid crystal molecules in the second states 315 and 316 are generally unstable and were shifted to the first states 313 and 314, respectively, in a short time (several ten μsec) when the applied voltage is removed.

In this example, the liquid crystal cell was sandwiched between a pair of cross nicol polarizers so that one of polarizing axes was aligned with the rubbing direction 310.

A a result, the liquid crystal molecules were placed in a light transmission (bright) state under the negative (-) voltage application and in a light interruption (dark) state under no or the positive (+) voltage application, respectively. Further, by the use of a weak (negative) voltage not causing the shift to the second states 315 and 136, the liquid crystal molecules remained in intermediate states (providing intermediate transmittances between the dark and right states), thus realizing a halftone display.

Under application of the positive voltage, the liquid crystal molecules stayed in the first states 313 and 314 in alignment with the rubbing direction 310 irrespective of the voltage values, thus resulting in the dark state (providing the lowest transmittance (e.g., transmittance=0%).

Figure 27:
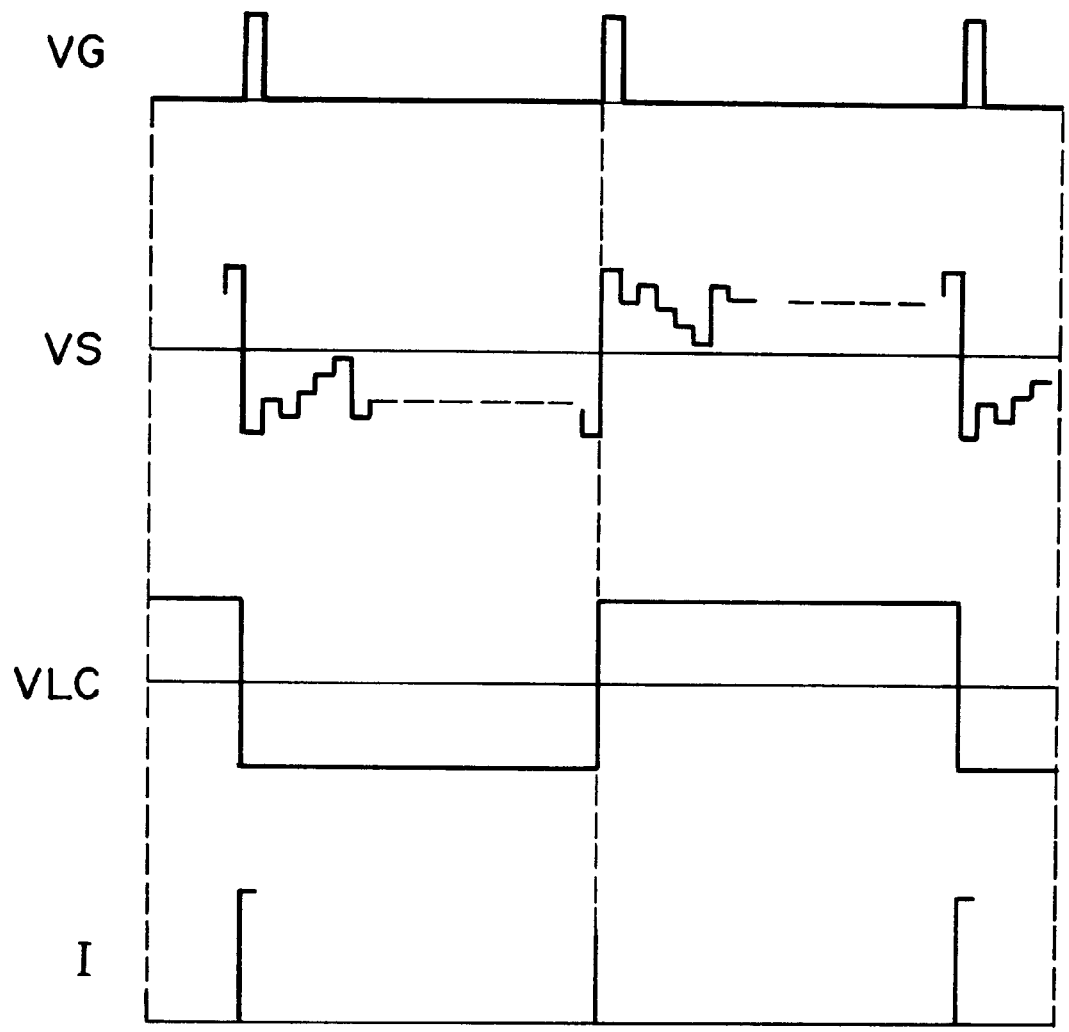
FIG. 27 is a set of views showing a timing for drive voltage application used in Example 16.

FIG. 27 shows driving voltage waveforms used in this example for explaining a voltage application timing.

Referring to FIG. 27, "VG", "VS", "VLC" and "I" represent a gate voltage, a source voltage, a voltage applied to the liquid crystal layer and a resultant transmittance of the liquid crystal layer, respectively.

In this example, in order to remove a DC component of a time-average value for the voltage applied to the liquid crystal layer, the source electrode was supplied with a voltage (VS) of an substantially identical absolute value opposite polarity for each (one) frame period.

Based on the respective voltage values in the frame periods under the negative (-) voltage application, images having respective transmittances corresponding to the voltage values were displayed.

In the frame periods under the positive (+) voltage application, the resulting transmittances were always zero (the lowest value), thus resulting in the dark images.

When the electrode structure used in this example was changed to a conventional one (one pixel electrode provided to one pixel), the liquid crystal molecules were only tilted to either one of the second states 315 and 316 under the voltage application for the pixel, thus showing a viewing angle-dependent transmittance (bright state) characteristic (such as a transmittance (or a bright state) varying depending on viewing angles).

In this example, for each pixel, the liquid crystal molecules were equally placed two opposite states 315 and 136, thus improving the viewing angle-dependent transmittance characteristic due to the averaged transmittance state.

As described hereinabove, according to the present invention, the following advantages (1) to (6) are obtained based on a particular electrode structure for each pixel wherein plural electrode portions on one substrate an a counter electrode portion on the other substrate are arranged to form a series circuit providing a plurality of capacitances (capacitor portions).

(1) The total capacitance of the optical modulation (liquid crystal) device is remarkably reduced to suppress the propagation delay of the input signal voltage waveform and the heat evolution, thus improving display qualities.

(2) The occurrence of the short circuit merely leads to a point defect (of the pixel concerned), thus substantially improving display qualities and production yields to realize cost reduction.

(3) The external electrical connection is performed on one substrate and accordingly the structure of the other substrate is simplified, thus leading to an improved production yield and easy incorporation into a panel casing.

(4) When the alignment film on the counter electrode is an electroconductive alignment film, the switching characteristic of the ferroelectric liquid crystal device is further improved to realize a good display performance.

(5) It is opposite to use the resin substrate as the substrate to be provided with the counter electrodes, thus providing a light-weight device with a high mechanical strength while preventing the liquid crystal injection failure. It is also possible t use the polarizing plate as the substrate to further reducing the production costs.

(6) In the active matrix-type device, a load exerted on the switching elements is lowered, thus allowing the use of switching elements having lower driving ability (capacitance) and high-speed driving ability (capacitance) and high-speed driving of the liquid crystal material having a larger particle size. When the liquid crystal used provides a voltage-transmittance characteristic such that a transmittance is continuously changed depending on an applied voltage, a desired gradation level display can be realized in an active matrix driving scheme.

What is claimed is:

1. An optical modulation device, comprising:
    a first substrate provided with a plurality of first electrodes each comprising a plurality of portions electrically independent of each other,
    a second substrate disposed opposite to the first substrate and provided with a plurality of second electrodes each confronting a corresponding first electrode, and
    an optical modulation substance disposed between the first and second substrates so as to form a plurality of pixels each having an electrode structure wherein a respective portion of the optical modulation substance is sandwiched between a respective second electrode and said portions of a corresponding first electrode so as to provide a plurality of capacitances connected in series, each of said plurality of capacitances being provided by a combination of each portion of the corresponding first electrode and the respective second electrode sandwiching the respective portion of the optical modulation substance.

2. A device according to claim 1, wherein said first electrodes comprise a plurality of scanning electrodes and a plurality of data electrodes intersecting the scanning electrodes, said second electrodes comprise a plurality of counter electrodes electrically independent of each other, and said portions comprise at least one scanning electrode and at least one data electrode.

3. A device according to claim 2, wherein said counter electrodes are coated with an electroconductive alignment film.

4. A device according to claim 2, wherein said counter electrodes contact the optical modulation substance.

5. A device according to claim 2, wherein said counter electrodes, said scanning electrodes and said data electrodes comprise a layer of an electroconductive resin, respectively.

6. A device according to claim 2, wherein said second substrate comprises a resin substrate.

7. A device according to claim 6, wherein said resin substrate comprises a polarizing plate.

8. A device according to claim 2, wherein said scanning electrodes and said data electrodes are electrically connected with auxiliary electrodes, respectively, via a common insulating layer.

9. A device according to claim 2, wherein said scanning electrodes and said data electrodes are electrically connected with a layer of a low-resistance substance, respectively.

10. A device according to claim 2, wherein each of said counter electrodes is in a floating state.

11. A device according to claim 2, wherein said optical modulation substance comprises a ferroelectric liquid crystal.

12. A device according to claim 2, wherein said optical modulation substance comprises an antiferroelectric liquid crystal.

13. A device according to claim 2, wherein said optical modulation substance comprises a nematic liquid crystal showing bistability.

14. A device according to claim 2, wherein said optical modulation substance comprises a liquid crystal and is placed in a state such that first liquid crystal molecules disposed between each counter electrode and its corresponding scanning electrode and second liquid crystal molecules disposed between the counter electrode and its corresponding data electrode form a prescribed angle providing a first transmittance of a bright state when supplied with a voltage of a first polarity and that said first and second liquid crystal molecules form an angle of zero degrees when supplied with a voltage of a second polarity opposite to the first polarity.

15. A device according to claim 14, wherein said liquid crystal comprises a ferroelectric liquid crystal having bistability and providing a tilt angle which is a half of an angle formed between liquid crystal molecules placed in one stable state and those placed in the other stable state, and said prescribed angle is four times the tilt angle.

16. An optical modulation device, comprising:
    a first substrate provided with a plurality of scanning signal lines, a plurality of data signal lines intersecting the scanning signal lines, a plurality of pixel electrodes each comprising a plurality of portions electrically independently of each other, and a plurality of switching elements;
    a second substrate provided with a plurality of counter electrodes confronting the pixel electrodes and electrically independent of each other, and
    an optical modulation substance disposed between the first and second substrates so as to form a plurality of pixels each provided with one switching element and each having an electrode structure wherein a respective portion of the optical modulation substance is sandwiched between a respective counter electrode and each portion of a corresponding pixel electrode so as to provide a plurality of capacitances connected in series as a load for each switching element, each of the plurality of capacitances being provided by a combination of each portion of the corresponding pixel electrode and the respective counter electrode sandwiching the respective portion of the optical modulation substance.

17. A device according to claim 16, wherein each of said counter electrodes comprises a plurality of portions electrically independent of each other for each pixel, and said series circuit provides at least three capacitances.

18. A device according to claim 16, wherein each of said switching elements comprises a thin film transistor.

19. A device according to claim 16, wherein said optical modulation substance comprises an antiferroelectric liquid crystal.

20. A device according to claim 16, wherein said optical modulation substance comprises a liquid crystal showing first to third alignment states such that said liquid crystal is in said first alignment state providing a first transmittance under no voltage application, and changes its alignment state from said first alignment state to said second alignment state providing a second transmittance under application of a voltage ($V_0$) of a first polarity and changes its alignment state from said first alignment state to aid third alignment state opposite to said second alignment state and providing said second transmittance under application of a voltage ($-V_0$) of a second polarity opposite to the first polarity, and wherein said device shows a voltage-transmittance characteristic such that a transmittance is continuously changed depending on an applied voltage between said first and second transmittances.

21. A device according to claim 16, wherein said portions of each pixel electrode comprises a first pixel electrode electrically connected with a corresponding switching element and a second pixel electrode electrically connected with a reference voltage signal line.

22. A device according to claim 16, wherein said portions of each pixel electrode comprises a first pixel electrode electrically connected with a corresponding switching element and a second pixel electrode electrically connected with an adjacent scanning signal line not electrically connected with said corresponding switching element.

23. A device according to claim 16, wherein said portions of each pixel electrode comprises a first pixel electrode and a second pixel electrode, and said optical modulation substance comprises a liquid crystal and is placed in a state such that first liquid crystal molecules disposed between each counter electrode and said first pixel electrode and second liquid crystal molecules disposed between the counter electrode and said second pixel electrode form a prescribed angle providing a first transmittance of a bright state when supplied with no voltage and when supplied with a voltage of a first polarity and that said first and second liquid crystal molecules form an angle of zero degrees when supplied with a voltage of a second polarity opposite to the first polarity; and wherein said device shows a voltage-transmittance characteristic such that a transmittance is continuously changed depending on an applied voltage between said first and second transmittances.

24. A device according to claim 23, wherein said liquid crystal comprises a smectic liquid crystal providing a tilt angle which is a half of an angle formed between liquid crystal molecules placed in a stable state and those placed in another stable state, and said prescribed angle is four times the tilt angle.

* * * * *

UNITED STATES PATENT AND TRADEMARK OFFICE
CERTIFICATE OF CORRECTION

PATENT NO. : 6,177,968 B1
DATED : January 23, 2001
INVENTOR(S) : Shinjiro Okada et al.

It is certified that error appears in the above-identified patent and that said Letters Patent is hereby corrected as shown below:

<u>Title page, Item [54] and Column 1, line 2,</u>
Title, "SERIES" should read -- SERIES- --.

Item [56], References Cited,
Under U.S. PATENT DOCUMENTS, "Shannnon" should read -- Shannon --;
"Katahara et al." should read -- Katakura et al. --.
Under OTHER PUBLICATIONS,
After N.A. Clark et al., "Ferroelectric" should read -- "Ferroelectric --; and
"Structure" should read -- Structure" --.
After English Abstract, "Application" should read -- Patent Application --.
Under FOREIGN PATENT DOCUMENTS,
"1151818" should read -- 1-151818 --;
"2153322" should read -- 2-153322 --;
"4182694" should read -- 4-182694 --;
"6230751" ahould read -- 6-230751 --;
"8262447" should read -- 8-262447 --;
"8328046" should read -- 8-328046 --.

<u>Column 1,</u>
Line 36, "call" should read -- cell --;
Line 42, "described" should read -- described by --.

<u>Column 2,</u>
Line 5, "1μ2 μm" should read -- 1 - 2 μm --;
Line 23, "to a" should read -- to have a --.

<u>Column 3,</u>
Line 40, "suppress" should read -- suppresses --.

<u>Column 4,</u>
Line 21, "show" should read -- shown --;
Line 33, "an" should read -- and --.

<u>Column 7,</u>
Line 24, "an" should read -- and --;
Line 25, "7A, 7B, and 7C" should read -- 7A to 7C --.

UNITED STATES PATENT AND TRADEMARK OFFICE
CERTIFICATE OF CORRECTION

PATENT NO. : 6,177,968 B1
DATED : January 23, 2001
INVENTOR(S) : Shinjiro Okada et al.

It is certified that error appears in the above-identified patent and that said Letters Patent is hereby corrected as shown below:

Column 9,
Line 48, "an" should read -- and --;
Line 55, "V2" should read -- U2 --;
Line 62, "32" should read -- 23 --.

Column 11,
Line 51, "substrate" should read -- substrates --.

Column 12,
Line 7, "in a firmly" should read -- in a film --;
Line 23, "an" should read -- to --;
Line 30, "an" should read -- to --.

Column 13,
Line 10, "corresponding" should read -- corresponding to --.

Column 14,
Line 3, "stable" should read -- stable state --;
Line 15, "is formed" should read -- are formed --;
Line 59, "that" should read -- than --.

Column 15,
Line 28, "may" should read -- may be --;
Line 34, "is divided into the first pixel electrode" should be deleted;
Line 49, "ar" should read -- are --;
Line 62, "each" should read -- each of --.

Column 16,
Line 9, "entire" should be deleted;
Line 14, "obtained a" should read -- obtained as --;
Line 40, "liens." should read -- lines. --;
Line 51, "turned" should read -- turned to the --;
Line 53, "changed" should read -- charged --;
Line 56, "is" should read -- are --.

UNITED STATES PATENT AND TRADEMARK OFFICE
CERTIFICATE OF CORRECTION

PATENT NO.    : 6,177,968 B1
DATED         : January 23, 2001
INVENTOR(S)   : Shinjiro Okada et al.

It is certified that error appears in the above-identified patent and that said Letters Patent is hereby corrected as shown below:

Column 18,
Line 2, "an" should read -- any --;
Line 11, "an" should read -- and --;
Line 15, "necessity" should read -- necessary --; and "change" should read -- charge --.

Column 19,
Line 2, "impresser" should read -- disperser --;
Line 5, "taken" should read -- being taken --;
Line 10, "20 kg/cm$^2$" should read -- 20 kg/cm$^2$, --.

Column 20,
Line 4, "was" should read -- were --;
Line 18, "a the" should read -- as the --.

Column 21,
Line 1, "Whight" should read -- Weight --;
Line 2, "trandition" should read -- transition --.

Column 23,
Line 8, "Culayer" should read -- Cu layer --.

Column 24,
Line 47, "cots" should read -- cost --.

Column 25,
Line 39, "tilted each other" should read -- tilted to each other --;
Line 41, "form" should read -- forms --.

Column 26,
Line 8, "no or" should be deleted;
Line 10, "136," should read -- 316, --;
Line 12, "right" should read -- bright --;
Line 29, "of an" should read -- of a --;
Line 47, "placed two" should read -- placed in two --; and "136," should read -- 316, --;
Line 53, "an a" should read -- and a --.

UNITED STATES PATENT AND TRADEMARK OFFICE
CERTIFICATE OF CORRECTION

PATENT NO.   : 6,177,968 B1
DATED        : January 23, 2001
INVENTOR(S)  : Shinjiro Okada et al.

It is certified that error appears in the above-identified patent and that said Letters Patent is hereby corrected as shown below:

Column 27,
Line 10, "t use" should read -- to use --.

Column 29,
Line 3, "aid" should read -- said --;
Line 11, "comprises" should read -- comprise --;
Line 17, "comprises" should read -- comprise --;
Line 23, "comprises" should read -- comprise --.

Signed and Sealed this

Thirtieth Day of July, 2002

Attest:

JAMES E. ROGAN
*Attesting Officer*   *Director of the United States Patent and Trademark Office*